(12) United States Patent
Kikuchi

(10) Patent No.: US 9,509,876 B2
(45) Date of Patent: Nov. 29, 2016

(54) PRINTING APPARATUS, CONTROL METHOD FOR PRINTING APPARATUS, AND STORAGE MEDIUM

(71) Applicant: CANON KABUSHIKI KAISHA, Tokyo (JP)

(72) Inventor: Shou Kikuchi, Tsukubamirai (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/949,479

(22) Filed: Nov. 23, 2015

(65) Prior Publication Data

US 2016/0156795 A1 Jun. 2, 2016

(30) Foreign Application Priority Data

Nov. 28, 2014 (JP) ................. 2014-242446

(51) Int. Cl.
*G03G 15/00* (2006.01)
*H04N 1/00* (2006.01)

(52) U.S. Cl.
CPC ........ *H04N 1/00737* (2013.01); *H04N 1/0032* (2013.01); *H04N 1/00745* (2013.01); *G03G 15/5062* (2013.01); *G03G 15/5095* (2013.01); *H04N 1/00355* (2013.01); *H04N 1/00748* (2013.01); *H04N 1/00761* (2013.01); *H04N 1/00779* (2013.01); *H04N 1/00968* (2013.01)

(58) Field of Classification Search
CPC ..................... H04N 1/00761; H04N 1/00745; H04N 1/00779; H04N 1/00355; H04N 1/00968; H04N 1/00748; G03G 15/5095; G03G 15/5062
USPC ........................................................ 399/45
See application file for complete search history.

(56) References Cited

FOREIGN PATENT DOCUMENTS

JP   2005-176045 A     6/2005
JP    2005176045 A  *  6/2005

\* cited by examiner

*Primary Examiner* — David Gray
*Assistant Examiner* — Tyler Hardman
(74) *Attorney, Agent, or Firm* — Canon U.S.A., Inc. IP Division

(57) ABSTRACT

A control method for a printing apparatus including a reading unit configured to read an image to generate image data includes printing, via a printing unit, an adjustment image, which is used to adjust a printing position, in such a way that the adjustment image is in contact with an end of a sheet, detecting the end of the sheet based on adjustment image data generated by the reading unit reading the adjustment image printed on the sheet by the printing unit, obtaining an amount of shift in the printing position based on the detected end of the sheet and the adjustment image data, and controlling, based on the obtained amount of shift in the printing position, the printing unit to print an image on the sheet.

4 Claims, 13 Drawing Sheets

FIG. 4

| SHEET NAME | SHEET LENGTH IN SUB SCANNING DIRECTION (mm) | SHEET LENGTH IN MAIN SCANNING DIRECTION (mm) | GRAMMAGE (g/m²) | SURFACE PROPERTY | COLOR | PREPRINTED SHEET | AMOUNT OF DEVIATION OF PRINTING POSITION (FRONT SURFACE) | AMOUNT OF DEVIATION OF PRINTING POSITION (BACK SURFACE) |
|---|---|---|---|---|---|---|---|---|
| PAPER MANUFACTURED BY ABC, RECYCLED PAPER 1 | 210 | 297 | 75 | PLAIN PAPER | WHITE | NO | LEAD POSITION: 0.3 mm<br>SIDE POSITION: -0.1 mm<br>MAIN SCANNING MAGNIFICATION: -0.02%<br>SUB SCANNING MAGNIFICATION: -0.01% | LEAD POSITION: 0.2 mm<br>SIDE POSITION: 0.1 mm<br>MAIN SCANNING MAGNIFICATION: 0.02%<br>SUB SCANNING MAGNIFICATION: -0.03% |
| PAPER MANUFACTURED BY ABC, RECYCLED PAPER 2 | 297 | 420 | 75 | PLAIN PAPER | WHITE | NO | LEAD POSITION: 0.0 mm<br>SIDE POSITION: -0.0 mm<br>MAIN SCANNING MAGNIFICATION: -0.00%<br>SUB SCANNING MAGNIFICATION: -0.00% | LEAD POSITION: 0.0 mm<br>SIDE POSITION: -0.0 mm<br>MAIN SCANNING MAGNIFICATION: +0.01%<br>SUB SCANNING MAGNIFICATION: -0.03% |
| PAPER MANUFACTURED BY DEF, EMBOSSED PAPER A-1 | 216 | 279 | 150 | EMBOSS | WHITE | NO | LEAD POSITION: 0.5 mm<br>SIDE POSITION: -0.5 mm<br>MAIN SCANNING MAGNIFICATION: +0.02%<br>SUB SCANNING MAGNIFICATION: +0.02% | LEAD POSITION: -0.3 mm<br>SIDE POSITION: 0.5 mm<br>MAIN SCANNING MAGNIFICATION: +0.01%<br>SUB SCANNING MAGNIFICATION: -0.03% |
| PAPER MANUFACTURED BY DEF, COATED PAPER P-1 | 279 | 432 | 128 | TWO-SIDED COAT | WHITE | NO | LEAD POSITION: 0.4 mm<br>SIDE POSITION: -0.2 mm<br>MAIN SCANNING MAGNIFICATION: +0.12%<br>SUB SCANNING MAGNIFICATION: +0.08% | LEAD POSITION: -0.2 mm<br>SIDE POSITION: 0.6 mm<br>MAIN SCANNING MAGNIFICATION: -0.02%<br>SUB SCANNING MAGNIFICATION: -0.01% |
| PAPER MANUFACTURED BY XYZ, COLORED PAPER 81 | 210 | 297 | 75 | PLAIN PAPER | ORANGE | NO | LEAD POSITION: 0.0 mm<br>SIDE POSITION: -0.0 mm<br>MAIN SCANNING MAGNIFICATION: -0.00%<br>SUB SCANNING MAGNIFICATION: +0.00% | LEAD POSITION: 0.0 mm<br>SIDE POSITION: -0.0 mm<br>MAIN SCANNING MAGNIFICATION: +0.00%<br>SUB SCANNING MAGNIFICATION: -0.00% |
| PAPER MANUFACTURED BY XYZ, COLORED PAPER 82 | 210 | 297 | 75 | PLAIN PAPER | PINK | NO | LEAD POSITION: 0.0 mm<br>SIDE POSITION: -0.0 mm<br>MAIN SCANNING MAGNIFICATION: -0.00%<br>SUB SCANNING MAGNIFICATION: +0.00% | LEAD POSITION: 0.0 mm<br>SIDE POSITION: -0.0 mm<br>MAIN SCANNING MAGNIFICATION: +0.00%<br>SUB SCANNING MAGNIFICATION: -0.00% |
| PAPER MANUFACTURED BY FGH, GRAPH PAPER 75 | 210 | 297 | 75 | PLAIN PAPER | WHITE | YES | LEAD POSITION: 0.0 mm<br>SIDE POSITION: -0.0 mm<br>MAIN SCANNING MAGNIFICATION: -0.00%<br>SUB SCANNING MAGNIFICATION: +0.00% | LEAD POSITION: 0.0 mm<br>SIDE POSITION: -0.0 mm<br>MAIN SCANNING MAGNIFICATION: +0.00%<br>SUB SCANNING MAGNIFICATION: -0.00% |
| PAPER MANUFACTURED BY FGH, PLAIN PAPER 2 | 210 | 297 | 75 | PLAIN PAPER | WHITE | NO | LEAD POSITION: -0.03 mm<br>SIDE POSITION: -0.07 mm<br>MAIN SCANNING MAGNIFICATION: +0.06%<br>SUB SCANNING MAGNIFICATION: -0.01% | LEAD POSITION: -0.03 mm<br>SIDE POSITION: -0.10 mm<br>MAIN SCANNING MAGNIFICATION: +0.04%<br>SUB SCANNING MAGNIFICATION: -0.02% |

EDITING OF SHEET MANAGEMENT TABLE

| SHEET NAME | SHEET LENGTH IN SUB SCANNING DIRECTION (mm) | SHEET LENGTH IN MAIN SCANNING DIRECTION (mm) | GRAMMAGE (g/m²) | SURFACE PROPERTY | COLOR |
|---|---|---|---|---|---|
| PAPER MANUFACTURED BY ABC, RECYCLED PAPER 1 | 210 | 297 | 75 | PLAIN PAPER | WHITE |
| PAPER MANUFACTURED BY ABC, RECYCLED PAPER 2 | 297 | 420 | 75 | PLAIN PAPER | WHITE |
| PAPER MANUFACTURED BY DEF, EMBOSSED PAPER A-1 | 216 | 279 | 150 | EMBOSS | WHITE |
| PAPER MANUFACTURED BY DEF, COATED PAPER P-1 | 279 | 432 | 128 | TWO-SIDED COAT | WHITE |
| PAPER MANUFACTURED BY XYZ, COLORED PAPER 81 | 210 | 297 | 75 | PLAIN PAPER | ORANGE |
| PAPER MANUFACTURED BY XYZ, COLORED PAPER 82 | 210 | 297 | 75 | PLAIN PAPER | PINK |

501 ADD NEW SHEET | 502 EDIT | DELETE | 503 ADJUST PRINTING POSITION

EDITING OF SHEET ATTRIBUTE

| | |
|---|---|
| SHEET NAME | PAPER MANUFACTURED BY XYZ, COLORED PAPER 81 |
| SHEET LENGTH IN SUB SCANNING DIRECTION (mm) | 210 |
| SHEET LENGTH IN MAIN SCANNING DIRECTION (mm) | 297 |
| GRAMMAGE (g/m²) | 75 |
| SURFACE PROPERTY | PLAIN PAPER ▼ |
| COLOR | WHITE ▼ |
| PREPRINTED SHEET | ☑ |

END EDITING ~511 | CANCEL

FIG.7

| | MEASUREMENT VALUE | IDEAL VALUE | AMOUNT OF DEVIATION OF PRINTING POSITION |
|---|---|---|---|
| LEAD POSITION (FRONT SURFACE) | $\frac{c+e}{2}$ | 1 cm | MEASUREMENT VALUE - IDEAL VALUE |
| SIDE POSITION (FRONT SURFACE) | $\frac{f+j}{2}$ | 1 cm | MEASUREMENT VALUE - IDEAL VALUE |
| MAIN SCANNING MAGNIFICATION (FRONT SURFACE) | $\frac{(b-d-f)+(b-h-j)}{2}$ | (SHEET LENGTH IN MAIN SCANNING DIRECTION) - 2 cm | $\frac{\text{(MEASUREMENT VALUE - IDEAL VALUE)}}{\text{IDEAL VALUE}}$ |
| SUB SCANNING MAGNIFICATION (FRONT SURFACE) | $\frac{(a-c-g)+(a-e-i)}{2}$ | (SHEET LENGTH IN SUB SCANNING DIRECTION) - 2 cm | $\frac{\text{(MEASUREMENT VALUE - IDEAL VALUE)}}{\text{IDEAL VALUE}}$ |
| LEAD POSITION (BACK SURFACE) | $\frac{k+m}{2}$ | 1 cm | MEASUREMENT VALUE - IDEAL VALUE |
| SIDE POSITION (BACK SURFACE) | $\frac{n+r}{2}$ | 1 cm | MEASUREMENT VALUE - IDEAL VALUE |
| MAIN SCANNING MAGNIFICATION (BACK SURFACE) | $\frac{(b-l-n)+(b-p-r)}{2}$ | (SHEET LENGTH IN MAIN SCANNING DIRECTION) - 2 cm | $\frac{\text{(MEASUREMENT VALUE - IDEAL VALUE)}}{\text{IDEAL VALUE}}$ |
| SUB SCANNING MAGNIFICATION (BACK SURFACE) | $\frac{(a-k-o)+(a-m-q)}{2}$ | (SHEET LENGTH IN SUB SCANNING DIRECTION) - 2 cm | $\frac{\text{(MEASUREMENT VALUE - IDEAL VALUE)}}{\text{IDEAL VALUE}}$ |

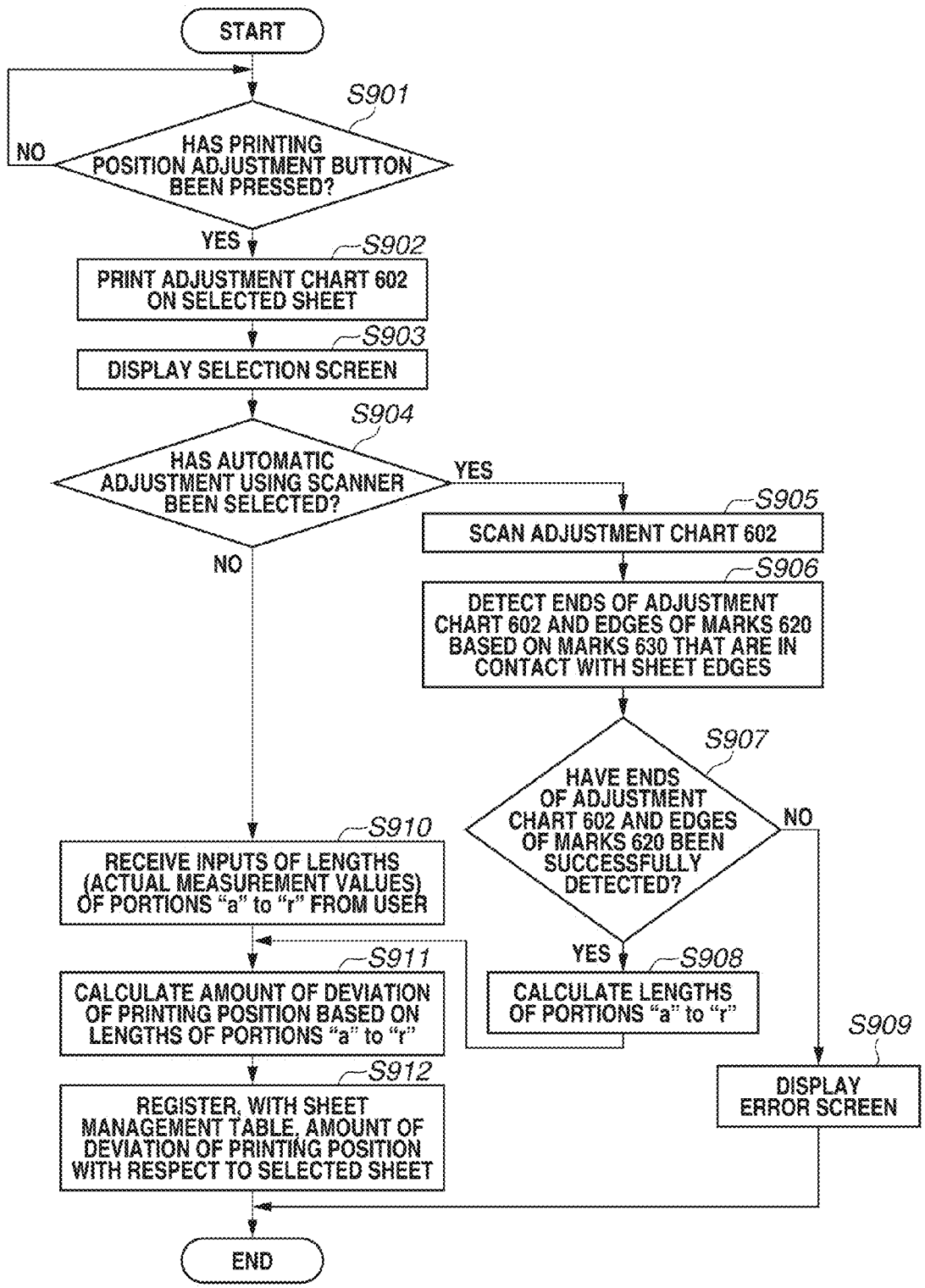

PRINTING APPARATUS, CONTROL METHOD FOR PRINTING APPARATUS, AND STORAGE MEDIUM

BACKGROUND OF THE INVENTION

1. Field of the Invention

Aspects of the present invention generally relate to a printing apparatus for printing an image on a sheet, a control method for the printing apparatus, and a storage medium.

2. Description of the Related Art

Some image forming apparatuses are configured to generate image data by reading a chart on which a black image with a predetermined width (hereinafter referred to as a "mark") is previously printed and to transmit the read image data to an image inspection apparatus. The image inspection apparatus measures a distance from the end of the chart to the edge of the mark (the distance of a margin portion) based on the received image data (see Japanese Patent Application Laid-Open No. 2005-176045).

Detection of the end of a chart and the edge of a mark is performed, for example, based on a change in density between the background of the chart and an area outside the chart, which is detected at the time of analysis of image data of the chart. On the other hand, in a case where a loss of highlight details occurs at the boundary between the background of the chart and an area outside the chart, no significant difference in density may be detected between the background of the chart and the area outside the chart. In a case where the end of the chart is not able to be detected, even if the edge of the mark is able to be detected, it is not possible to measure a distance from the end of the chart to the edge of the mark. However, in respect of the image forming apparatus and the image inspection apparatus discussed in Japanese Patent Application Laid-Open No. 2005-176045, a case where the end of a chart is not able to be detected from image data of the chart is not into consideration.

SUMMARY OF THE INVENTION

According to an aspect of the present invention, a printing apparatus includes a reading unit configured to read an image to generate image data, a printing unit configured to print an adjustment image, which is used to adjust a printing position, in such a way that the adjustment image is in contact with an end of a sheet, a detecting unit configured to detect the end of the sheet based on adjustment image data generated by the reading unit reading the adjustment image printed on the sheet by the printing unit, an obtaining unit configured to obtain an amount of shift in the printing position based on the end of the sheet detected by the detecting unit and the adjustment image data, and a print controlling unit configured to control, based on the amount of shift in the printing position obtained by the obtaining unit, the printing unit to print an image on the sheet.

Further features of the present invention will become apparent from the following description of exemplary embodiments with reference to the attached drawings.

BRIEF DESCRIPTION OF THE DRAWINGS

FIG. 4 illustrates an example of a table according to the first exemplary embodiment.

FIGS. 5A and 5B illustrate configurations of screens according to the first exemplary embodiment.

FIG. 7 illustrates an example of a table according to the first exemplary embodiment.

FIG. 9 is a flowchart illustrating an example of a control operation according to the first exemplary embodiment.

DESCRIPTION OF THE EMBODIMENTS

Various exemplary embodiments, features, and aspects of the invention will be described in detail below with reference to the drawings. It should be noted that the exemplary embodiments described below do not limit the present invention defined in the claims, and not all of combinations of features described in the exemplary embodiments are essential for the resolution of issues in the present invention.

Figure 1:
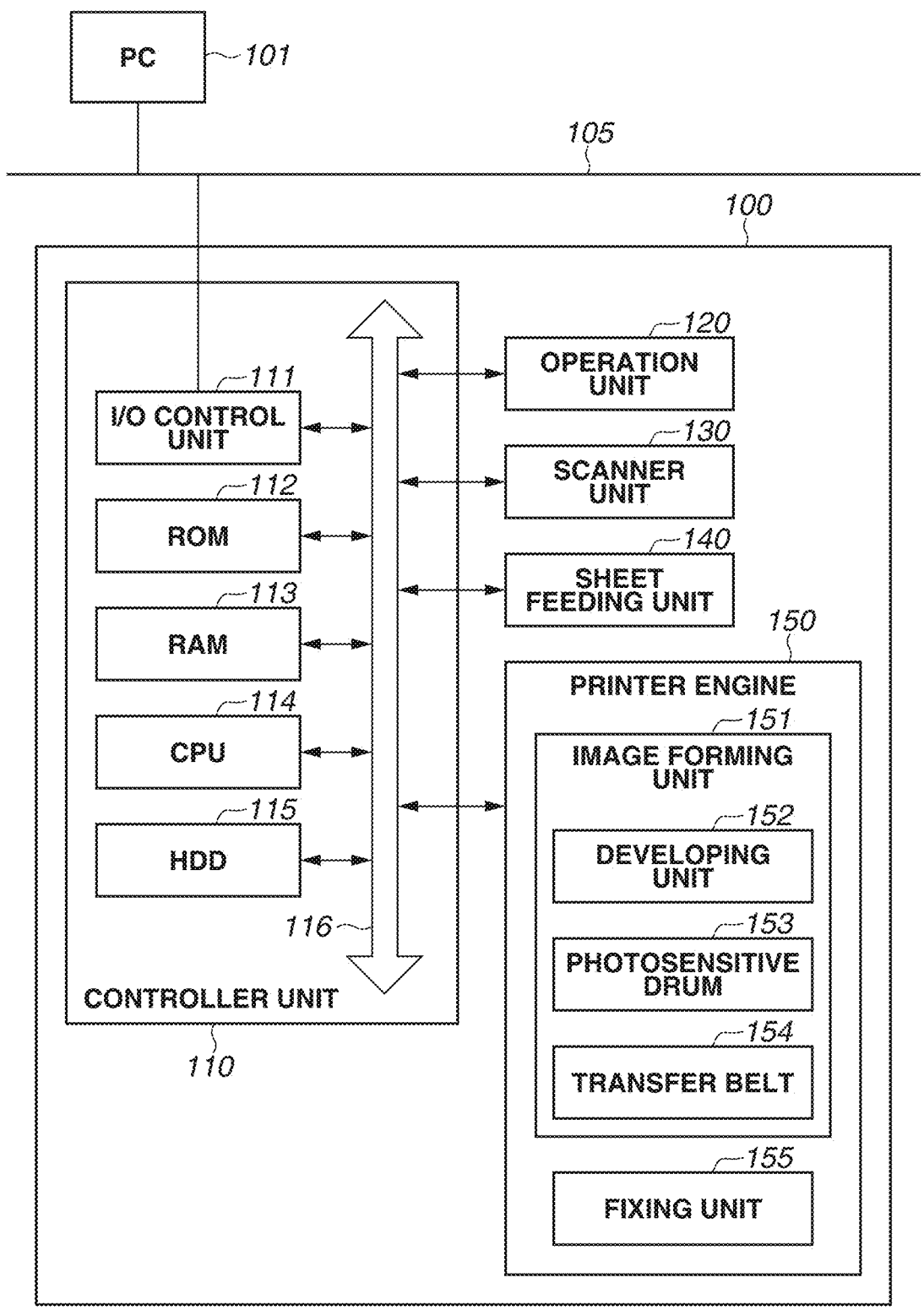
FIG. 1 is a block diagram illustrating a configuration of a printing system according to a first exemplary embodiment.

A configuration of a printing system according to a first exemplary embodiment of the present invention is described with reference to FIG. 1.

In the first exemplary embodiment, to perform automatic adjustment of the printing position on a sheet, a central processing unit (CPU) 114 instructs an image forming unit 151 to print an adjustment chart on which a predetermined mark is formed in such a way that the predetermined mark is in contact with a part of the end of the sheet. Then, the CPU 114 analyzes image data generated by reading an image of the adjustment chart on which the predetermined mark is printed. The CPU 114 detects the end of the adjustment chart and the edge of the predetermined mark based on a difference in density obtained as a result of the analysis. Then, the CPU 114 automatically calculates the amount of deviation of the printing position based on the detected end of the adjustment chart and the detected edge of the predetermined mark, and thus adjusts the printing position.

The details of such adjustment operation are described below.

The printing system according to the present exemplary embodiment includes a printing apparatus 100 and a personal computer (PC) 101, which is an example of an external apparatus.

The printing apparatus 100 is equipped with an image reading function to read a document to generate image data and a printing function (copying function) to print an image on a sheet based on the generated image data. Furthermore, the printing apparatus 100 is equipped with a printing function (PC printing function) to print characters or an image on a sheet based on data for which a printing instruction is received. The printing function can include color printing and/or monochromatic printing.

A controller unit (control unit) 110 of the printing apparatus 100 is connected to the PC 101 via a network cable 105. The present exemplary embodiment is not limited to such a configuration that the controller unit 110 and the PC 101 are interconnected via the network cable 105. For example, the controller unit 110 and the PC 101 can be interconnected via a local area network (LAN). Alternatively, the controller unit 110 and the PC 101 can be interconnected via a wide area network (WAN), such as the Internet, or a dedicated printer cable. While, in the configuration illustrated in FIG. 1, a single PC 101 is connected to the printing apparatus 100 via the network cable 105, this is not limiting. For example, a plurality of PCs 101 can be connected to the printing apparatus 100 via the network cable 105.

The PC 101, for example, generates image data using application software, and transmits the generated image data to the printing apparatus 100. Furthermore, the PC 101, for example, generates page-description language (PDL) data using application software or using a printer driver. Then, the controller unit 110 rasterizes the PDL data transmitted from the PC 101 via the network cable 105 to generate bit-mapped data. A program or computer-executable instructions for executing such a rasterizing operation are stored in a read-only memory (ROM) 112 or a hard disk drive (HDD) 115, which are described below.

While, in the present exemplary embodiment, the PC 101 is described as an example of an external apparatus, this is not limiting. For example, the external apparatus can be a portable information terminal, such as a personal digital assistant (PDA) or a smartphone, a network connection terminal, or an external dedicated apparatus.

Next, a configuration of the printing apparatus 100 according to the present exemplary embodiment is described with reference to the block diagram of FIG. 1. The printing apparatus 100 includes the controller unit 110, a printer engine 150, which is an image output device, a scanner unit 130, which is an image input device, a sheet feeding unit 140, and an operation unit 120. These units included in the printing apparatus 100 are electrically interconnected and are configured to mutually transmit and receive control commands and data.

The controller unit 110 comprehensively controls the operation of the printing apparatus 100, and performs input-output control for image information and device information. The controller unit 110 includes, as a plurality of functional blocks, the CPU 114, an input-output (I/O) control unit 111, the ROM 112, a random access memory (RAM) 113, and the HDD 115. These modules included in the controller unit 110 are interconnected via a system bus 116.

The CPU 114 is a processor that controls the entire printing apparatus 100. The CPU 114 comprehensively controls access to various connected devices based on a control program or computer-executable instructions stored in the ROM 112. Furthermore, the CPU 114 comprehensively controls various processing operations that are performed inside the controller unit 110.

The I/O control unit 111 is a module for performing communication control with an external network.

The RAM 113 is a readable and writable memory. The RAM 113 is also a system work memory that is used for the CPU 114 to operate. The RAM 113 can store image data input from the scanner unit 130 or the PC 101, various programs, and various pieces of setting information.

The ROM 112 is a read-only memory. The ROM 112 has a system boot program stored in advance.

The HDD 115 can mainly store information (system software) required to activate and operate the controller unit 110 and image data.

Furthermore, in a case where a nonvolatile RAM (NVRAM) (not illustrated) is included in the controller unit 110, system software, image data, and setting information received via the operation unit 120, which is described below, may be stored in the NVRAM.

A sheet management table 400 used to manage, in a list form, attribute information about sheets used for printing by the printing apparatus 100 is stored in the RAM 113 or the HDD 115. The details of the sheet management table 400 are described below with reference to FIG. 4.

Various control programs required to perform various processing operations illustrated in the flowcharts described below, which are executed by the CPU 114, are stored in the ROM 112 or the HDD 115. Furthermore, a display control program for displaying various user interface (UI) screens on a display portion (not illustrated) of the operation unit 120 is also stored in the ROM 112 or the HDD 115. The CPU 114 reads out a program stored in the ROM 112 or the HDD 115 and loads the program onto the RAM 113, thus performing various operations according to the present exemplary embodiment.

The printer engine 150 includes the image forming unit 151 and a fixing unit 155. The image forming unit 151 includes a developing unit 152, a photosensitive drum 153, and a transfer belt 154. The details of the image forming unit 151 and the fixing unit 155 are described below with reference to FIG. 2.

The scanner unit 130 scans the image of a document (sheet) using an optical sensor to acquire scan image data. The details of the scanner unit 130 are described below with reference to FIGS. 3A and 3B.

The sheet feeding unit 140 feeds sheets from a plurality of sheet holding units (for example, a sheet feeding cassette, a sheet feeding deck, and a manual tray). Each sheet holding unit is able to store any of a plurality of types of sheets, and is also able to store a plurality of sheets. The uppermost sheet among a plurality of sheets stored in the sheet holding unit is separated one by one and is then conveyed to the image forming unit 151. Then, the image forming unit 151 prints an image on the sheet fed from the sheet holding unit based on image data input from the scanner unit 130 or the PC 101.

The operation unit 120 corresponds to an example of a user interface unit. The operation unit 120 includes a display portion (not illustrated) and a key input portion (not illustrated). Furthermore, the operation unit 120 has a function to receive various settings from the user via the display portion or the key input portion, and also has a function to provide the user with information via the display portion.

The display portion is composed of a liquid crystal display (LCD) and a touch panel sheet having transparent electrodes (or of the electrostatic capacitance type) attached onto the LCD. The LCD is available to display an operation screen and information indicating the status of the printing apparatus 100. The key input portion includes, for example, a start key used to issue an instruction to start the execution of scanning or copying, a stop key used to issue an instruction to stop the operation in process of scanning or copying, and other function keys.

Next, an example of a configuration of the image forming unit 151 is described with reference to the sectional view of FIG. 2.

The image forming unit 151 forms a toner image on the circumferential surface of the photosensitive drum 153 using the developing unit 152 according to image data generated by the controller unit 110.

The developing unit 152 is arranged opposite the photosensitive drum 153. The inside of the developing unit 152 is divided by a partition wall 201, which extends in the vertical direction, into a developing portion 202 and an agitation portion 203.

A nonmagnetic developing sleeve 204, which rotates in the direction of arrow 241, is arranged in the developing portion 202. A magnet 205 is fixedly arranged inside the developing sleeve 204.

The developing sleeve 204 conveys developer (for example, two-component developer including magnetic carrier and nonmagnetic toner) extracted by a blade 206. Then, the developing sleeve 204 supplies developer to the photosensitive drum 153 at a developing region opposite the photosensitive drum 153, thus developing an electrostatic latent image on the photosensitive drum 153. To improve a developing efficiency, in other words, the rate of application of toner to an electrostatic latent image, a developing bias voltage obtained by superposing direct current on alternating current is applied to the developing sleeve 204.

Screws 207 and 208 for agitating developer are arranged inside the developing portion 202 and the agitation portion 203, respectively. The screw 207 agitates developer contained in the developing portion 202, and conveys the agitated developer. On the other hand, the screw 208 agitates toner 213, which is supplied by the rotation of a conveyance screw 212 from a toner discharge port 211 of a toner replenishing tank 210, and developer 214, which is already present inside the developing unit 152. Then, the screw 208 conveys the agitated developer, thus uniformizing the toner density.

Figure 2:
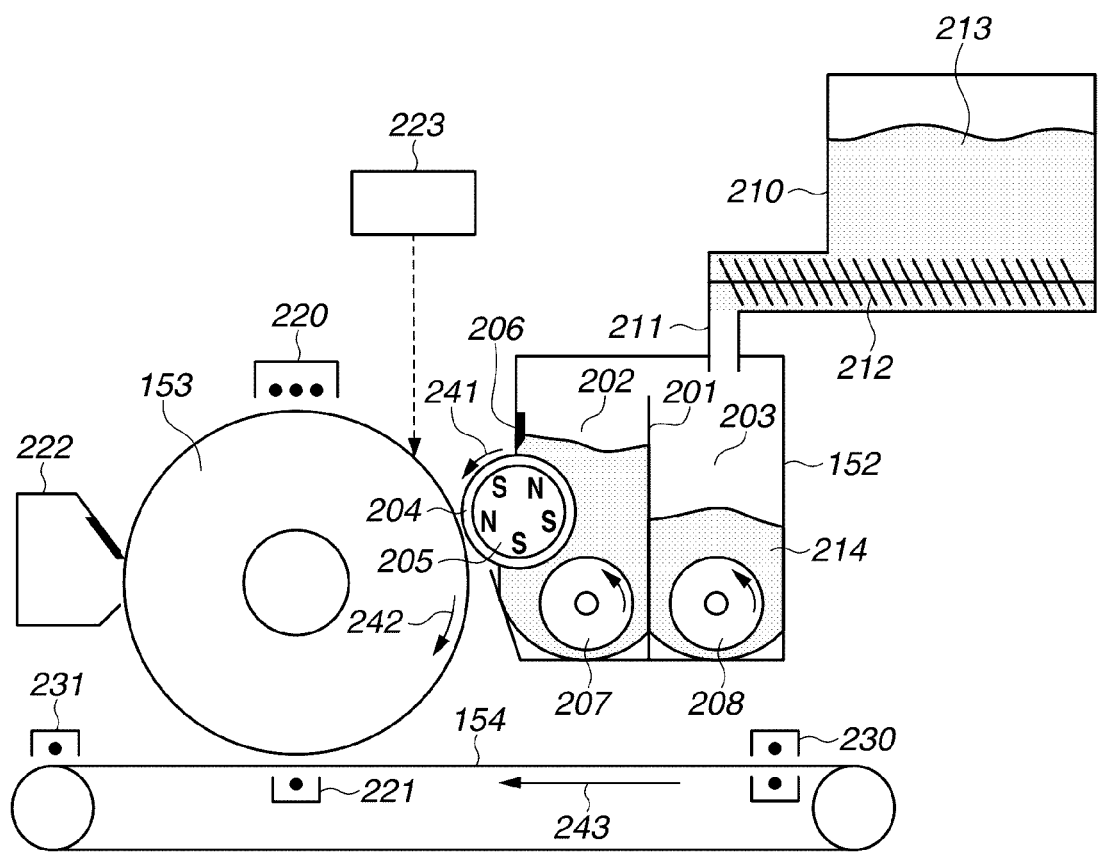
FIG. 2 is a sectional view illustrating an example configuration of an image forming unit according to the first exemplary embodiment.

Furthermore, the partition wall 201 is provided with developer passages (not illustrated), through which the developing portion 202 and the agitation portion 203 communicate with each other, at the near-side end and the far-side end as viewed in FIG. 2. Developer inside the developing portion 202 the toner density of which is lowered by the consumption of toner due to developing is moved by the conveyance force of the screws 207 and 208 from one of the developer passages to the inside of the agitation portion 203. Then, developer the toner density of which has been restored inside the agitation portion 203 is moved from the other of the developer passages to the inside of the developing portion 202.

The photosensitive drum 153 is driven to rotate in the direction of arrow 242. Around the photosensitive drum 153, there are sequentially arranged a primary charging device 220, which uniformly charges the photosensitive drum 153, the developing unit 152, a transfer unit 221, which transfers a developed visible image onto a sheet, and a drum cleaner 222 in the rotation direction of the photosensitive drum 153.

Furthermore, an image exposure device 223 is mounted above the photosensitive drum 153. The image exposure device 223, which is composed of a semiconductor laser, a polygon mirror, a reflecting mirror, and other members, receives a digital pixel signal (video data) corresponding to an image converted into a digital signal by the controller unit 110, and radiates a laser beam modulated according to the digital pixel signal.

The image exposure device 223 radiates the laser beam in such a way as to perform scanning between the primary charging device 220 and the developing unit 152 in the generating line direction of the photosensitive drum 153.

Then, the drum surface of the photosensitive drum 153 is exposed to form an electrostatic latent image. After that, according to the rotation of the photosensitive drum 153, the electrostatic latent image is developed into a visible toner image by the developing unit 152.

Below the photosensitive drum 153, a transfer belt 154 for conveying a sheet in the direction of arrow 243 is arranged to be stretched between a plurality of rollers.

A sheet fed from the sheet feeding unit 140 is conveyed from the right side of the transfer belt 154 as viewed in FIG. 2. Then, the sheet is borne by the transfer belt 154 under the action of a pair of attraction charging devices 230 arranged opposite each other across the transfer belt 154 and is conveyed to the left side of the transfer belt 154 (in the direction of arrow 243). Then, when the sheet passes between the photosensitive drum 153 and the transfer unit 221, the visible toner image developed on the photosensitive drum 153 is transferred onto the sheet under the action of the transfer unit 221. The sheet onto which the toner image is transferred is separated from the transfer belt 154 by a static elimination charging device 231 and is then conveyed to the fixing unit 155.

Then, when the sheet passes between a pressure roller (not illustrated) and a heating roller (not illustrated), which are included in the fixing unit 155, toner is fused and pressed. This causes the toner image to be fixed to the sheet. Furthermore, toner remaining on the photosensitive drum 153 after the transfer of toner to the sheet is removed by the drum cleaner 222.

Next, an example of a configuration of the scanner unit 130 is described with reference to the sectional views of FIGS. 3A and 3B.

The method for reading the image of a document 301 includes a flow reading method and an optical system movement method. In the flow reading method, the document 301 is placed on a document stacking portion (also referred to as a document tray) 340, and, while the document 301 is being conveyed by an automatic document feeder (ADF), the image of the document 301 is read at the position of a fixed optical system (also referred to as an ADF reading method). On the other hand, in the optical system movement method, the document 301 is placed on a platen glass (document positioning plate) 302, and, while the optical system is being moved, the image of the document 301 is read at the fixed document position (also referred to as a pressure plate reading method).

While, in the present exemplary embodiment, the scanner unit 130 is equipped with both of a configuration for scanning the document 301 according to the ADF reading method and a configuration for scanning the document 301 according to the pressure plate reading method, this is not limiting. In the first exemplary embodiment, the scanner unit 130 may be equipped with at least one of the configuration for scanning the document 301 according to the ADF reading method and the configuration for scanning the document 301 according to the pressure plate reading method.

Furthermore, an instruction to start a reading operation (also referred to as a scanning operation) for the image of a document 301 in the scanner unit 130 is issued, for example, by the user pressing a start key for issuing an instruction to start the execution of scanning. Alternatively, the instruction to start a scanning operation may be issued, for example, by the user pressing a start button displayed on the display portion of the operation unit 120.

First, an operation for reading the image of the document 301 using a pressure plate is described with reference to FIG. 3A.

When an instruction to start the scanning operation is received, to read the image of the document 301 placed on the platen glass 302, a first mirror unit 303 and a second mirror unit 304 are once returned by the driving of a motor 312 to a position where a home position sensor 305 is located. Then, a document illumination lamp 306 is turned on, and the document 301 is illuminated with light emitted from the document illumination lamp 306. Reflected light from the document 301 passes via a first mirror 307 included in the first mirror unit 303, a second mirror 308 included in the second mirror unit 304, and a third mirror 309 included in the second mirror unit 304. Reflected light from the third mirror 309 passes thorough a lens 310 to focus on a charge-coupled device (CCD) sensor 311 and enters the CCD sensor 311 as a light signal.

The second mirror unit 304 moves at a speed (V/2) that is half the speed (V) of the first mirror unit 303. This enables the whole surface of the document 301 to be scanned.

While, in the present exemplary embodiment, an optical system included in the scanner unit 130 is a reduction optical system for focusing reflected light from the document 301 on the CCD sensor 311, this is not limiting. For example, the optical system included in the scanner unit 130 may be a unit magnification optical system for focusing reflected light from the document 301 on a contact image sensor (CIS).

Next, an operation for reading the image of the document 301 using an ADF is described with reference to FIG. 3B.

When a document detection sensor (not illustrated) arranged between a pickup roller 322 and a feeding roller 323 has detected that a document (not illustrated) is set on the document stacking portion 340, the scanning operation for the document according to the ADF reading method is started.

When an instruction to start the scanning operation is received, first, a document feeding portion 341 separates the uppermost sheet of a document stack (the document) one by one by a friction separation system and conveys the separated sheet (document) to a registration roller pair 324. Furthermore, to feed the document, the pickup roller 322 descends onto the surface of the document stack and an intermediate plate (not illustrated) ascends to press the document stack against the feeding roller 323, thus starting a preparatory operation for feeding the document. After that, when a motor (not illustrated) is driven to rotate the feeding roller 323 and the pickup roller 322 clockwise, the document is conveyed. The second and subsequent sheets to be fed following the uppermost sheet are kept still by a friction piece (not illustrated), thus remaining on the document stacking portion 340. Furthermore, a separation sensor (not illustrated) mounted downstream of the feeding roller 323 detects that the document has been separated.

After that, the separated document passes between guide plates (not illustrated) and are conveyed to the registration roller pair 324. When the leading edge of the document has reached the registration roller pair 324, the registration roller pair 324 is at a stop. Then, the registration roller pair 324 allows the document to be warped in a loop shape to correct any skew of the document, and conveys the document to a document conveying portion 342.

Figure 3A:
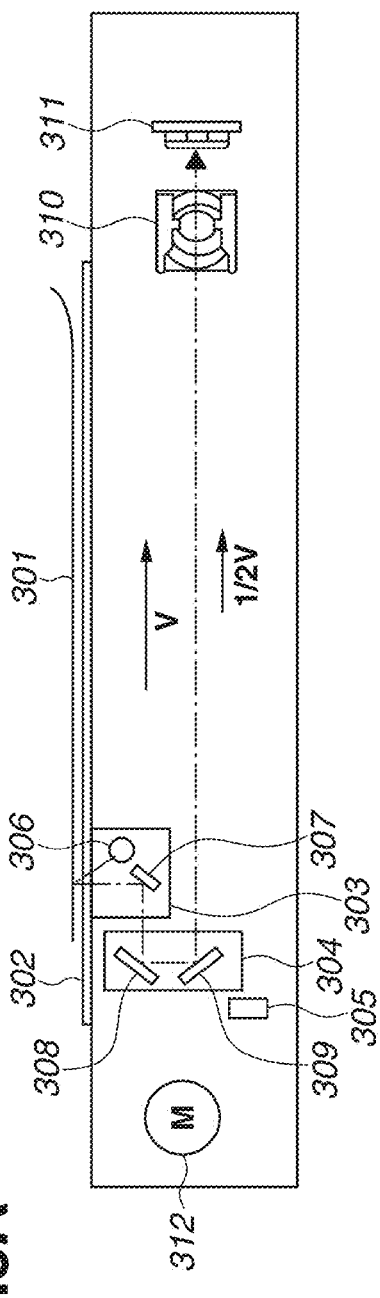
FIGS. 3A and 3B are sectional views illustrating an example configuration of a scanner unit according to the first exemplary embodiment.

In the document conveying portion 342, a conveyance belt 325 is stretched between a driving roller 326 and a driven roller 327, and is configured to be rotated while being pressed by pressure rollers 328 against the platen glass 302 (FIG. 3A). When being conveyed between the conveyance belt 325 and the platen glass 302, the document passes above the platen glass 302 under the action of frictional force of the conveyance belt 325.

When the document has reached a predetermined position on the platen glass 302 after being conveyed by the conveyance belt 325 from the document feeding portion 341 to the document conveying portion 342, a drive motor (not illustrated) stops such that the document is stopped from being conveyed. Then, the scanner unit 130 reads the image of the document.

Upon completion of reading by the scanner unit 130, the document is conveyed by the conveyance belt 325 to a document reversing and discharging portion 343. At this time, a reversing flapper (diverter) 331, which regulates the travel path of a sheet in the vicinity of the entrance of the document reversing and discharging portion 343, causes the document to be conveyed to a reversing roller 329 under the control of a solenoid (not illustrated). Then, the document is conveyed to a conveyance roller pair 330 while being pinched between the reversing roller 329 and a reversing roller 332, which faces the reversing roller 329.

When the trailing end of the document has reached a point at which the document exits a discharging flapper 333, the discharging flapper 333 rotates clockwise and the reversing roller 329 is reversed to rotate clockwise. This causes the document to start being conveyed in a reverse direction. In this way, the document, which has been conveyed by the clockwise rotation of the reversing roller 329, is then discharged to a document discharging portion 344. Here, in a case where a subsequent document follows, the subsequent document is conveyed to the predetermined position by the rotation of the conveyance belt 325 in a manner similar to that of the preceding document. Then, the image of the subsequent document, which has been stopped at the reading position due to the stop of the drive motor, is read by the scanner unit 130. During the process of this scanning operation, the preceding document is reversed between front and back surfaces by the document reversing and discharging portion 343, which operates independently, and is then conveyed to the document discharging portion 344.

Figure 3B:
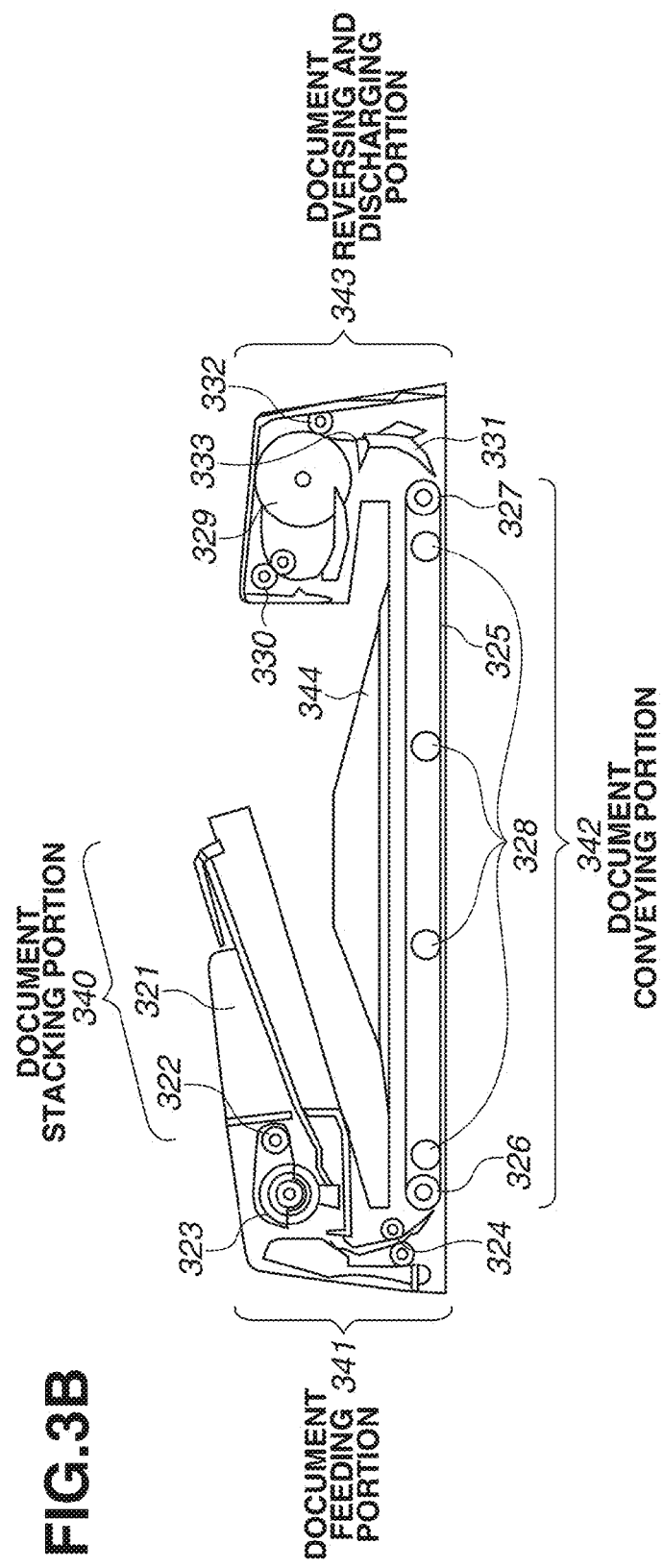

While, in the example illustrated in FIG. 3B, to read the image of the document 301 using the ADF, a method for conveying the document to a position used for reading by the pressure plate reading method and stopping the conveyance of the document to perform scanning (an optical system movement method) is employed, this is not limiting. For example, in a case where the scanner unit 130 is equipped with a reading sensor fixed onto the conveyance path for documents, the method for reading the image of the document 301 using the ADF may be a method for performing scanning while conveying the document at a constant speed (a flow reading method).

Furthermore, while, in the example illustrated in FIG. 3B, to scan the back surface of the document using the ADF reading method, a method for, after scanning the front surface of the document, reversing and conveying the document to subsequently scan the back surface of the document (referred to as two-sided reversal reading) is employed, this is not limiting. For example, in a case where the scanner unit 130 is equipped with two reading sensors respectively arranged above and below the conveyance path for documents, a method for simultaneously scanning the front and back surfaces of the document while performing the flow reading method (referred to as two-sided simultaneous reading) may be employed to perform the ADF reading method.

Next, the details of the sheet management table 400 used to manage attribute information about sheets used for printing by the printing apparatus 100 are described with reference to FIG. 4.

The sheets used for printing by the printing apparatus 100 include, for example, sheets that are normally used, sheets that are previously evaluated by printer manufacturers, and user-defined sheets in which attribute information about the normally used sheets or the previously evaluated sheets is customized by users. Attribute information about these various sheets is stored in the RAM 113 or the HDD 115 in such a list form as the sheet management table 400. Each data registered with the sheet management table 400 is digital information of the Extensible Markup Language (XML) format or the comma-separated values (CSV) format. Furthermore, each software module is able to read and write data to the sheet management table 400 stored in the RAM 113 or the HDD 115.

Next, the details of data (attribute information about sheets) registered with the sheet management table 400 are described in the following.

Sheet name 411 is information for identifying respective sheets used for printing.

Sheet length in the sub scanning direction 412, sheet length in the main scanning direction 413, grammage of a sheet 414, and surface property of a sheet 415 are physical properties of sheets used for printing. The surface property of a sheet 415 is an attribute indicating the physical property of the surface of the sheet, which includes, for example, "coat" indicating a surface coating applied for improving glossiness, and "emboss" indicating a surface having raised and recessed portions.

Color of a sheet 416 is an attribute indicating the color of the background of the sheet. Preprinted sheet 417 is information for determining whether the sheet used for printing is a preprinted sheet.

The printing apparatus 100 adjusts any deviation of the printing position relative to a sheet at the time of execution of printing in such a manner that an image is printed at an ideal printing position. Amount of deviation of the printing position relative to the front surface of a sheet 420 is information indicating the amount of positional deviation from an ideal printing position on the front surface of the sheet. On the other hand, amount of deviation of the printing position relative to the back surface of a sheet 421 is information indicating the amount of positional deviation from an ideal printing position on the back surface of the sheet.

The amounts of deviation of the printing position 420 and 421 include, for example, the amount of deviation of the printing position in the sub scanning direction relative to a sheet (hereinafter referred to as the amount of deviation of the lead position). The lead position refers to the start position of printing of an image with the end of a chart in the lead in the conveyance direction of a sheet set as a starting point. Furthermore, the initial value of the leading position is zero. To adjust the amount of deviation of the lead position, the start timing of radiation of a laser beam to be radiated from the image exposure device 223 to the photosensitive drum 153 is adjusted. This results in a change of the start position of printing of an image with the end of a chart in the lead in the conveyance direction of a sheet set as a starting point.

Furthermore, the amounts of deviation of the printing position 420 and 421 include, for example, the amount of deviation of the printing position in the main scanning direction relative to a sheet (hereinafter referred to as the amount of deviation of the side position). The side position refers to the start position of printing of an image with the end of a chart at the leading edge in the conveyance direction of a sheet set as a starting point. Furthermore, the initial value of the side position is zero. To adjust the amount of deviation of the side position, the start timing of radiation of a laser beam to be radiated from the image exposure device 223 to the photosensitive drum 153 is adjusted. This results in a change of the start position of printing of an image with the end of a chart at the left side in the conveyance direction of a sheet set as a starting point.

Moreover, the amounts of deviation of the printing position 420 and 421 include, for example, the amount of deviation of an image length (a magnification relative to an ideal length) in the sub scanning direction and the amount of deviation of an image length (a magnification relative to an ideal length) in the main scanning direction. Furthermore, the initial values of the sub scanning magnification and the main scanning magnification are zero. The sub scanning magnification can be adjusted by controlling the driving speed of the transfer belt 154. On the other hand, the main scanning magnification can be adjusted by controlling the clock frequency for a laser beam into which the image exposure device 223 modulates a digital image signal.

The amounts of deviation of the printing position 420 and 421 are calculated by scanning, with the scanner unit 130, an adjustment chart on which predetermined marks are printed and detecting the positions of the marks on the adjustment chart. The details of the adjustment chart on which predetermined marks are printed are described below with reference to FIGS. 6A and 6B. Furthermore, the details of a method for detecting the positions of the marks on the adjustment chart are described below with reference to FIGS. 8A and 8B.

Furthermore, while, as mentioned in the foregoing, the amounts of deviation of the printing position 420 and 421 are adjusted, for example, by adjusting the radiation timing of a laser beam, this is not limiting. For example, the deviation of the printing position may be adjusted by shifting an image itself to be printed on a sheet as much as a predetermined amount and printing the shifted image on the sheet. Moreover, to adjust the amount of deviation of the printing position, the user may arbitrarily specify the amount of shift of an image to be printed on a sheet.

An editing screen 500 illustrated in FIG. 5A can be used to edit the attribute information about sheets registered with the sheet management table 400 or to additionally register a new sheet with the sheet management table 400. The editing screen 500 is displayed, for example, on the display portion of the operation unit 120 or a monitor (not illustrated) of the PC 101.

A sheet selected by the user on the editing screen 500 is highlighted (displayed inverted). In the example illustrated in FIG. 5A, sheet of "paper manufactured by XYZ, colored paper 81" is highlighted. The user can press a button 501 on the editing screen 500 to add a new sheet to be registered with the sheet management table 400. Furthermore, the user can press a button 502 on the editing screen 500 to edit attribute information about the selected sheet (the highlighted sheet). An editing screen 510 illustrated in FIG. 5B is invoked according to the user pressing the button 501 or the button 502. The editing screen 510 is displayed, for example, on the display portion of the operation unit 120 or a monitor (not illustrated) of the PC 101.

The user can enter, on the editing screen 510, various data, such as sheet name, sheet length in the sub scanning direction, sheet length in the main scanning direction, grammage, surface property, color, and preprinted sheet. Furthermore, the surface property can be selected from a list of surface properties supportable by the printing apparatus 100. Moreover, the color can be selected from a list of previously registered colors. When, after various data are entered by the user, a button 511 on the editing screen 510 is pressed by the user, the data entered at that point of time (the attribute information about the sheet) is finalized and is registered with the sheet management table 400.

The user can enter, on the editing screen 510, attribute information about sheet name, sheet length in the sub scanning direction, sheet length in the main scanning direction, grammage, surface property, and color. Furthermore, the user can select one surface property from a list of surface properties supportable by the printing apparatus 100. Moreover, the user can arbitrarily select one color from a list of previously registered colors. Additionally, the user can enter, on the editing screen 510, information indicating whether the sheet to be edited is a preprinted sheet.

When the editing end button 511 on the editing screen 500 is pressed by the user, the sheet attribute entered at that point of time is finalized and is stored in the sheet management table 400.

Then, when a button 503 on the editing screen 500 is pressed by the user, a series of processing operations for adjusting the printing position relative to the selected sheet (the highlighted sheet) can be performed. The details of a series of processing operations for adjusting the printing position are described below with reference to FIG. 9.

Next, adjustment charts used to adjust the printing position are described with reference to the schematic diagrams of FIGS. 6A and 6B.

Figure 6A:
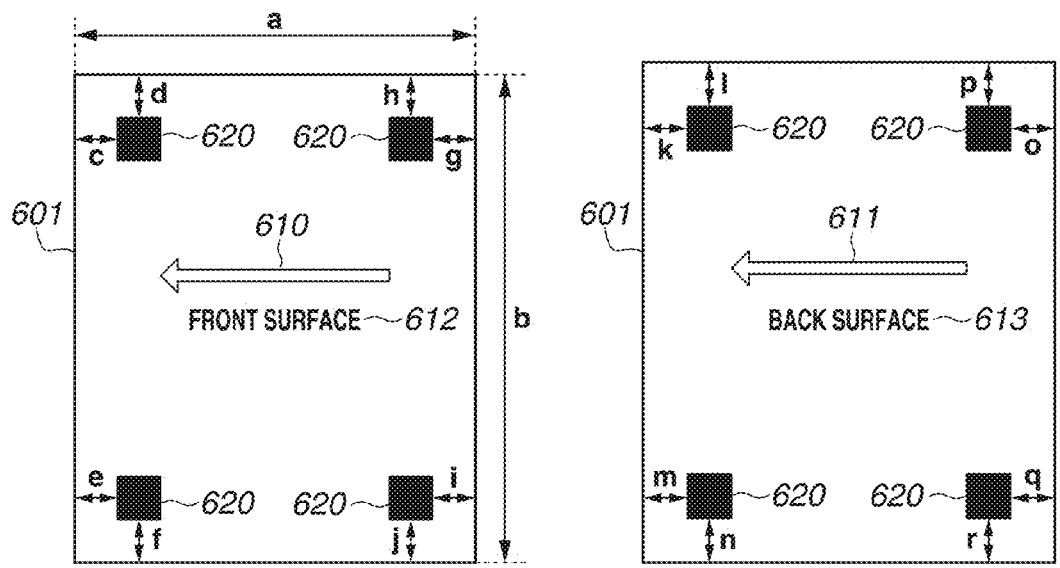
FIGS. 6A and 6B are schematic diagrams illustrating examples of adjustment charts according to the first exemplary embodiment.

First, a case where an adjustment chart 601 illustrated in FIG. 6A is used to adjust the printing position relative to the sheet is described.

Image data for the adjustment chart 601 is stored in the RAM 113 or the HDD 115. To print the adjustment chart 601, image data for the adjustment chart 601 is read out from the RAM 113 or the HDD 115 and is then transferred to the printer engine 150.

To adjust the printing position on the front surface relative to the sheet, marks 620 are printed at specific positions (for example, four corners) on the front surface of the sheet. Furthermore, to adjust the printing position on the back surface relative to the sheet, marks 620 are printed at specific positions (for example, four corners) on the back surface of the sheet. The marks 620 are formed with toner of a color (for example, black toner) that greatly differs in reflectance from that of an ordinary sheet. In this way, the marks 620 are printed at four portions on each of the front surface and the back surface of the adjustment chart 601 (at eight portions in total).

On the front surface of the adjustment chart 601, an image 610 for identifying the conveyance direction of the adjustment chart 601 and an image 612 for identifying the front surface of the adjustment chart 601 are printed. Furthermore, on the back surface of the adjustment chart 601, an image 611 for identifying the conveyance direction of the adjustment chart 601 and an image 613 for identifying the back surface of the adjustment chart 601 are printed.

Thus, to perform positional adjustment of two-sided images at the time of execution of two-sided printing, the image 610 and the image 612 can be printed on the front surface of the adjustment chart 601, and the image 611 and the image 613 can be printed on the back surface of the adjustment chart 601. On the other hand, to adjust the printing position at the time of execution of one-sided printing, the image 610 and the image 612 can be printed on the front surface of the adjustment chart 601.

Furthermore, the images 610 and 611 for identifying the conveyance direction of the adjustment chart 601 need to be printed only in a case where the adjustment chart 601 is scanned by the ADF reading method, but do not need to be printed in a case where the adjustment chart 601 is scanned by the pressure plate reading method.

Furthermore, as illustrated in FIG. 6A, the images 610 and 611 are, for example, arrows based on which the user can identify the conveyance direction of the adjustment chart 601. On the other hand, the images 612 and 613 are, for example, characters based on which the user can identify the front or back surface of the adjustment chart 601.

Figure 6B:
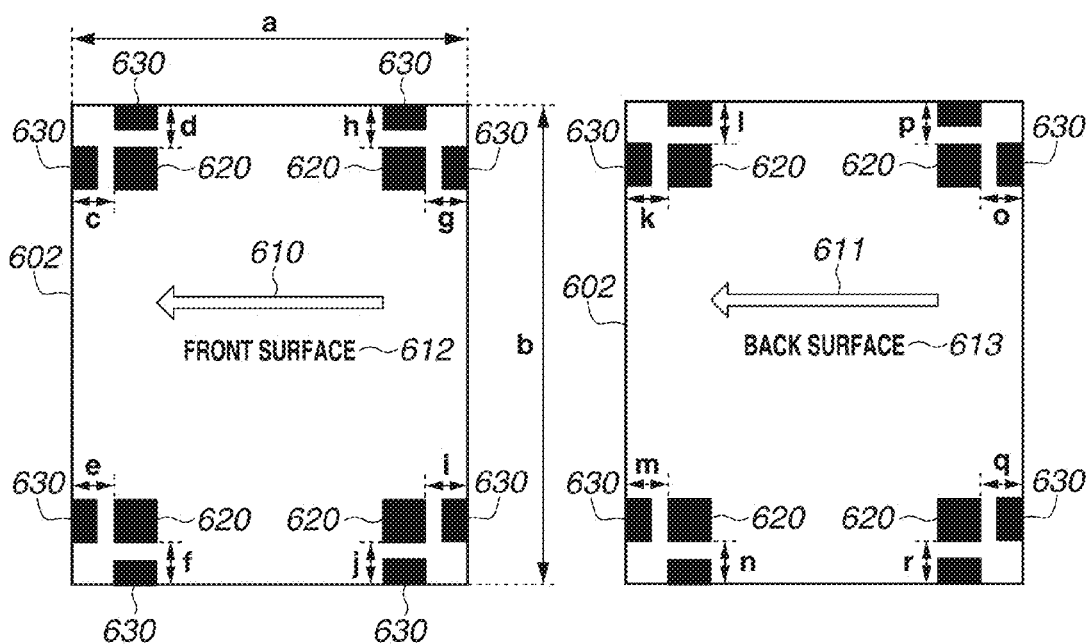

Next, a case where an adjustment chart 602 illustrated in FIG. 6B is used to adjust the printing position relative to the sheet is described.

Image data for the adjustment chart 602 is stored in the RAM 113 or the HDD 115. To print the adjustment chart 602, image data for the adjustment chart 602 is read out from the RAM 113 or the HDD 115 and is then transferred to the printer engine 150.

To adjust the printing position on the front surface relative to the sheet, marks 620 are printed at specific positions (for example, four corners) on the front surface of the sheet. Furthermore, to adjust the printing position on the back surface relative to the sheet, marks 620 are printed at specific positions (for example, four corners) on the back surface of the sheet. The marks 620 are formed with toner of a color (for example, black toner) that greatly differs in reflectance from that of an ordinary sheet.

Furthermore, on the adjustment chart 602, to detect the ends of the adjustment chart 602, marks 630 with a predetermined width are printed in such a manner that each mark 630 is in contact with a part of the corresponding end of the adjustment chart 602. Furthermore, at the time of printing of the adjustment chart 602, images of the marks 630 are formed on the photosensitive drum 153 in such a manner that a toner image (a toner image of the mark 630) to be transferred to a sheet by the transfer unit 221 is in contact with the end of the sheet.

The mark 630 to be printed on the adjustment chart 602 has a predetermined width. Therefore, even if a deviation of the printing position occurs at the time of printing of the adjustment chart 602, the mark 630 is printed in such a manner that the mark 630 is in contact with the end of the adjustment chart 602, as long as the amount of deviation of the printing position is within a range available for adjustment (for example, within 6 mm).

The mark 630 is not limited to the size or shape illustrated in FIG. 6B as long as the mark is in contact with a part of the end of the adjustment chart 602. The color of the mark 630 may be the same as or may be different from the color of the mark 620. Thus, on the adjustment chart 602, the marks 630 are printed with toner of a color (for example, black toner) that greatly differs in reflectance from that of an ordinary sheet.

The details of a method for detecting the end of the adjustment chart 602 are described below with reference to FIGS. 8A and 8B.

In this way, the marks 620 are printed at four portions on each of the front surface and the back surface of the adjustment chart 602 (at eight portions in total), and the marks 630 are printed at eight portions on each of the front surface and the back surface of the adjustment chart 602 (at sixteen portions in total).

On the front surface of the adjustment chart 602, an image 610 for identifying the conveyance direction of the adjustment chart 602 and an image 612 for identifying the front surface of the adjustment chart 602 are printed. Furthermore, on the back surface of the adjustment chart 602, an image 611 for identifying the conveyance direction of the adjustment chart 602 and an image 613 for identifying the back surface of the adjustment chart 602 are printed.

Thus, to perform positional adjustment of two-sided images at the time of execution of two-sided printing, the image 610 and the image 612 can be printed on the front surface of the adjustment chart 602, and the image 611 and the image 613 can be printed on the back surface of the adjustment chart 602. On the other hand, to adjust the printing position at the time of execution of one-sided printing, only the image 610 and the image 612 can be printed on the front surface of the adjustment chart 602.

Furthermore, the images 610 and 611 for identifying the conveyance direction of the adjustment chart 602 need to be printed only in a case where the adjustment chart 602 is scanned by the ADF reading method, but do not need to be printed in a case where the adjustment chart 602 is scanned by the pressure plate reading method.

Furthermore, as illustrated in FIG. 6B, the images 610 and 611 are, for example, arrows based on which the user can identify the conveyance direction of the adjustment chart 602. On the other hand, the images 612 and 613 are, for example, characters based on which the user can identify the front or back surface of the adjustment chart 602.

When the mark 620 is printed in an ideal position, the mark 620 is located to be printed at a position a predetermined distance away from the end of the adjustment chart 601. Accordingly, in the present exemplary embodiment, in a case where the adjustment of the printing position on the front surface relative to the sheet is performed using the adjustment chart 601, the positions of the marks 620 printed on the front surface of the adjustment chart 601 are measured, so that the amount of deviation of the printing position on the front surface of the sheet is calculated (or obtained). Similarly, in the present exemplary embodiment, in a case where the adjustment of the printing position on the front surface relative to the sheet is performed using the adjustment chart 602, the positions of the marks 620 printed on the front surface of the adjustment chart 602 are measured, so that the amount of deviation of the printing position on the front surface of the sheet is calculated (or obtained).

Furthermore, in a case where the adjustment of the printing position on the back surface relative to the sheet is performed using the adjustment chart 601, the positions of the marks 620 printed on the back surface of the adjustment chart 601 are measured, so that the amount of deviation of the printing position on the back surface of the sheet is calculated (or obtained). Similarly, in the present exemplary embodiment, in a case where the adjustment of the printing position on the back surface relative to the sheet is performed using the adjustment chart 602, the positions of the marks 620 printed on the back surface of the adjustment chart 602 are measured, so that the amount of deviation of the printing position on the back surface of the sheet is calculated (or obtained).

Furthermore, the amount of deviation of the printing position on the back surface relative to the printing position on the front surface or the amount of deviation of the printing position on the front surface relative to the printing position on the back surface may be calculated (or obtained) by detecting relative positions of the respective marks 620 printed on the front surface and the back surface of the adjustment chart 601. Similarly, the amount of deviation of the printing position on the back surface relative to the printing position on the front surface or the amount of deviation of the printing position on the front surface relative to the printing position on the back surface may be calculated (or obtained) by detecting relative positions of the respective marks 620 printed on the front surface and the back surface of the adjustment chart 602.

Next, a case where the adjustment of the printing position is performed using the adjustment chart 601 or the adjustment chart 602 is described in the following with reference to FIGS. 6A and 6B.

To measure the positions of the respective marks 620 on the front surface and the back surface of the adjustment chart 601 or 602, portions "a" to "j" on the front surface of the adjustment chart 601 or 602 are measured. Moreover, portions "k" to "r" on the back surface of the adjustment chart 601 or 602 are also measured.

The portion "a" indicates the length of the adjustment chart 601 or 602 in the sub scanning direction, and the portion "b" indicates the length of the adjustment chart 601 or 602 in the main scanning direction. Furthermore, the ideal length of the portion "a" is the sheet length in the sub scanning direction 412 registered with the sheet management table 400. Moreover, the ideal length of the portion "b" is the sheet length in the main scanning direction 413 registered with the sheet management table 400. On the other hand, each of the lengths of the portions "c" to "r" is a distance from the corresponding mark 620 to the nearest end of the adjustment chart 601 or 602.

Furthermore, the method for measuring the lengths of the portions "a" to "r" includes a manual measuring method and an automatic calculating method. In the manual measuring method, the user actually measures the lengths of the portions "a" to "r" by applying a ruler to the adjustment chart 601 or 602.

On the other hand, in the automatic calculating method, the adjustment chart 601 or 602 is scanned by the scanner unit 130. Then, the CPU 114 analyzes image data generated by reading an image of the adjustment chart 601 or 602. As a result of the analysis, the CPU 114 detects the ends of the adjustment chart 601 or 602 and the edges of the marks 620 (in other words, the boundaries between the background of the adjustment chart 601 or 602 and the marks 620) based on density differences. Then, the CPU 114 calculates the lengths of the portions "a" to "r" based on the detected ends of the adjustment chart 601 or 602 and the detected edges of the marks 620.

Next, a method for calculating the amount of deviation of the printing position based on the measured positions of the marks 620 is described with reference to FIG. 7.

Measurement values 710, ideal values 711, and amounts of deviation of the printing position 712 of each of the "lead position", "side position", "main scanning magnification", and "sub scanning position" on each of the front surface and the back surface of the adjustment chart 601 or 602 are defined with a table illustrated in FIG. 7. The table 700 is stored in the RAM 113 or the HDD 115.

For example, the measurement value 710 of the "lead position" on the front surface of the adjustment chart 601 or 602 is calculated from actual measurement values of the portions "c" and "e" illustrated in FIG. 6A or 6B using a mathematical expression set forth in the table 700. In other words, the lead position is an average value of distances from the ends of the adjustment chart 601 or 602 at the lead in the conveyance direction of the sheet to the corresponding marks 620.

Furthermore, for example, the measurement value 710 of the "side position" on the front surface of the adjustment chart 601 or 602 is calculated from actual measurement values of the portions "f" and "j" illustrated in FIG. 6A or 6B using a mathematical expression set forth in the table 700. In other words, the side position is an average value of distances from the ends of the adjustment chart 601 or 602 at the left side in the conveyance direction of the sheet to the corresponding marks 620.

Furthermore, for example, the measurement value 710 of the "main scanning magnification" on the front surface of the adjustment chart 601 or 602 is calculated from actual measurement values of the portions "b", "d", "f", "h", and "j" illustrated in FIG. 6A or 6B using a mathematical expression set forth in the table 700. In other words, the main scanning magnification is an average value of distances between marks 620 aligned on the same scanning line in the main scanning direction.

Furthermore, for example, the measurement value 710 of the "sub scanning magnification" on the front surface of the adjustment chart 601 or 602 is calculated from actual measurement values of the portions "a", "c", "e", "g", and "i" illustrated in FIG. 6A or 6B using a mathematical expression set forth in the table 700. In other words, the sub scanning magnification is an average value of distances between marks 620 aligned on the same scanning line in the sub scanning direction.

As set forth in the table 700, each of the ideal values 711 of the "lead position" and "side position" is 1 cm. Thus, ideally, the mark 620 is to be printed at a position 1 cm away from the corresponding end of the adjustment chart 601 or 602.

Furthermore, as set forth in the table 700, the ideal value 711 of the "main scanning magnification" is a value obtained by subtracting 2 cm from the sheet length in the main scanning direction for each sheet registered with the sheet management table 400. Similarly, the ideal value 711 of the "sub scanning magnification" is a value obtained by subtracting 2 cm from the sheet length in the sub scanning direction for each sheet registered with the sheet management table 400.

Furthermore, as set forth in the table 700, the amount of deviation of the printing position 712 in each of the "lead position", "side position", "main scanning magnification", and "sub scanning magnification" is calculated using the corresponding measurement value 710 and the corresponding ideal value 711.

More specifically, the amount of deviation of the printing position 712 in each of the "lead position" and "side position" is calculated by subtracting the ideal value 711 from the measurement value 710, in which the unit is mm. On the other hand, the amount of deviation of the printing position 712 in each of the "main scanning magnification" and "sub scanning magnification" is calculated by dividing a value obtained by subtracting the ideal value 711 from the measurement value 710 by the ideal value 711, in which the unit is %.

The amount of deviation of the printing position 712 calculated in the above-described way is registered with the sheet management table 400 as attribute information about the sheet.

As described above, in a case where the adjustment of the printing position is performed using the adjustment chart 601, according to the method for automatically calculating the lengths of the portions "a" to "r", the adjustment chart 601 is scanned by the scanner unit 130. Then, the CPU 114 analyzes image data generated by reading an image of the adjustment chart 601, and focuses on a change in density between the background of the adjustment chart 601 and an area outside the adjustment chart 601. As a result of the analysis, the CPU 114 detects the ends of the adjustment chart 601 and the edges of the marks 620 (in other words, the boundaries between the background of the adjustment chart 601 and the marks 620) based on differences in density. Then, the CPU 114 calculates the lengths of the portions "a" to "r" based on the detected ends of the adjustment chart 601 and the detected edges of the marks 620.

However, in a case where a loss of highlight details occurs at the boundary between the background of the adjustment chart 601 and an area outside the adjustment chart 601 at the time of reading of the adjustment chart 601, no significant difference in density between the background of the adjustment chart 601 and the area outside the adjustment chart 601 may be detected. In such a case, since the end of the adjustment chart 601 cannot be detected, even if the edge of the mark 620 can be detected, a distance from the end of the adjustment chart 601 to the edge of the mark 620 (for example, the portion "c" of the adjustment chart 601) cannot be measured. Thus, in a case where a loss of highlight details occurs at the boundary between the background of the adjustment chart 601 and an area outside the adjustment chart 601 at the time of reading of the adjustment chart 601, since a distance from the end of the adjustment chart 601 to the edge of the mark 620 cannot be calculated, the automatic adjustment of the printing position relative to the sheet may not be performed.

Therefore, in the first exemplary embodiment, to perform the automatic adjustment of the printing position relative to the sheet, the CPU 114 instructs the image forming unit 151 to print an adjustment chart 602 on which marks 630 are formed in such a way as to be in contact with respective parts of the ends of the adjustment chart 602.

On the adjustment chart 602, as mentioned in the foregoing, the marks 630 are printed, with toner of a color (for example, black toner) that greatly differs in reflectance from that of an ordinary sheet, in such a way as to be in contact with respective parts of the ends of the adjustment chart 602. Since the marks 630 are printed at the respective ends of the adjustment chart 602, a loss of highlight details becomes unlikely to occur as compared with a case where no marks 630 are printed at the respective ends of the adjustment chart 602.

The CPU 114 analyzes image data generated by reading an image of the adjustment chart 602 having the marks 630 printed thereon. As a result of the analysis, the CPU 114 detects the ends of the adjustment chart 602 and the edges of the marks 630 (in other words, the boundaries between the background of the adjustment chart 602 and the marks 630). Then, the CPU 114 automatically calculates the amount of deviation of the printing position based on the detected ends of the adjustment chart 602 and the detected edges of the marks 630, and then adjusts the printing position based on the calculated amount of deviation of the printing position.

The details of an operation for detecting the ends of the adjustment chart 602 and the edges of the marks 630 are described below.

A method for detecting an end 810 of the adjustment chart 602 based on image data 800 generated by scanning the adjustment chart 602 with the scanner unit 130 is described with reference to FIGS. 8A and 8B.

First, a part of image data generated by scanning the adjustment chart 602 with the scanner unit 130 is described with reference to FIG. 8A.

The end 810 is a sheet end of the image data 800. An analysis range 811 is a range in which to analyze the image data 800. The analysis of the image data 800 is performed by measuring changes in density from an image end of the image data 800 in each of the main scanning direction and the sub scanning direction on a pixel-by-pixel basis, and the end 810 and the mark 620 are detected based on a result of the measurement. Furthermore, the unit used for measurement may be a unit smaller than the pixel unit or may be a unit larger than the pixel unit. Moreover, the interval of reading may be a constant interval or a thinned-out interval.

Next, an example of the result of analysis of the image data 800 in the analysis range 811 is described with reference to FIG. 8B. The density measurement of the image data 800 in the analysis range 811 starts with the sheet end (image end) of the image data 800.

Figure 8A:
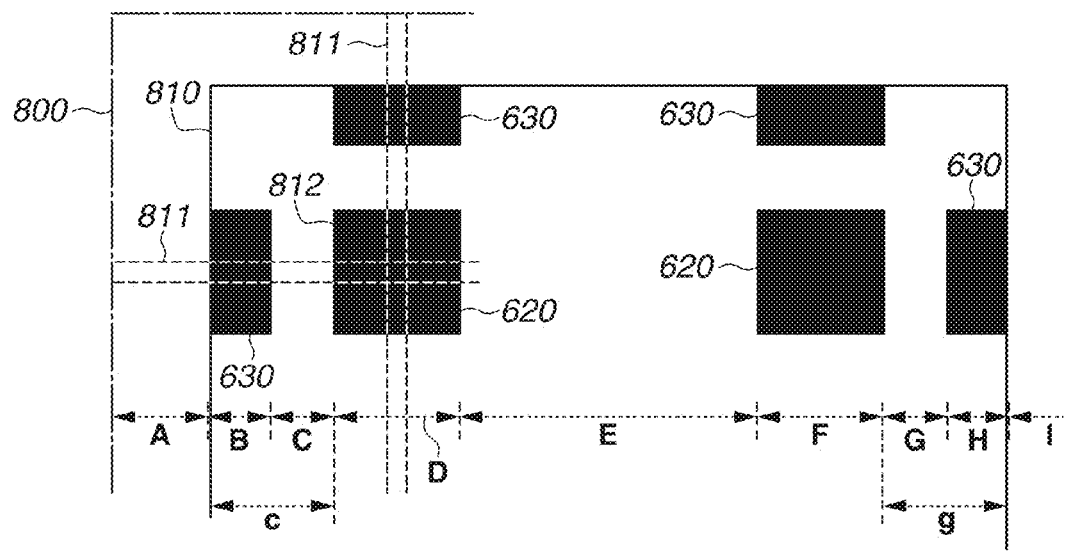
FIGS. 8A and 8B illustrate a method for detecting the end of a chart according to the first exemplary embodiment.
Figure 8B:
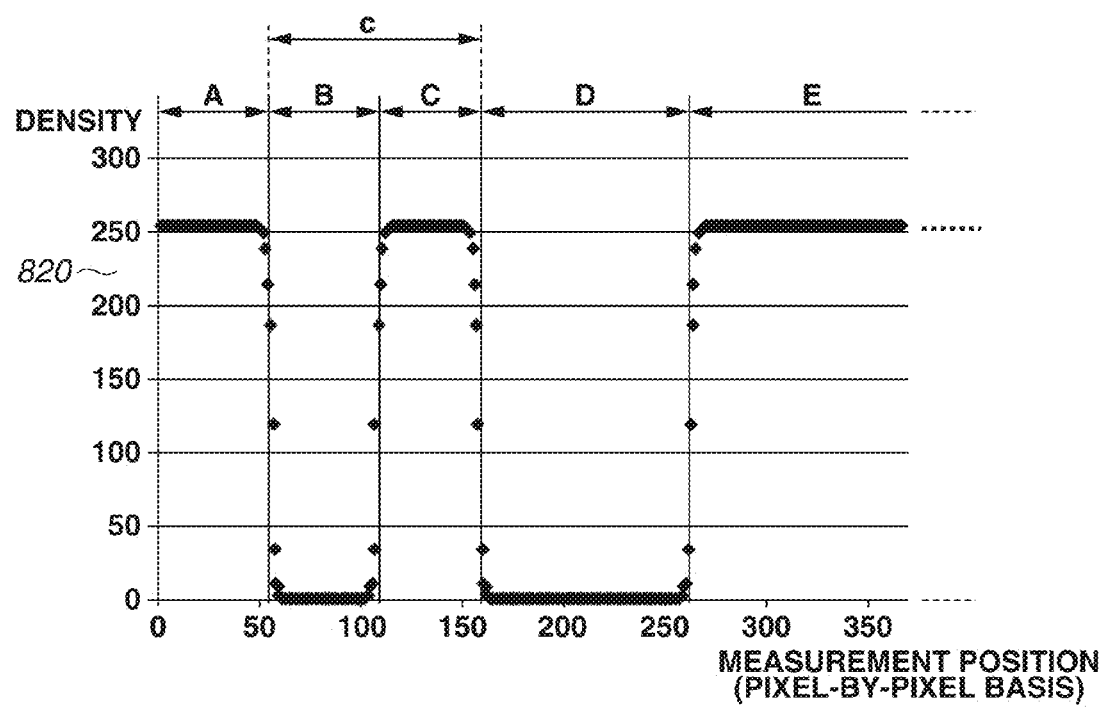

First, the CPU 114 detects the density of an area outside the sheet, which corresponds to a section A illustrated in FIG. 8A. Then, the CPU 114 detects the density of a portion corresponding to the mark 630, which corresponds to a section B illustrated in FIG. 8A. Next, the CPU 114 detects the density of the background of the sheet located between the mark 630 and the mark 620, which corresponds to a section C illustrated in FIG. 8A. Subsequently, the CPU 114 detects the density of a portion corresponding to the mark 620, which corresponds to a section D illustrated in FIG. 8A.

Then, the CPU 114 detects the density of the background of the sheet, which corresponds to a section E illustrated in FIG. 8A. Next, the CPU 114 detects the density of a portion corresponding to the mark 620, which corresponds to a section F illustrated in FIG. 8A. Subsequently, the CPU 114 detects the density of the background of the sheet located between the mark 620 and the mark 630, which corresponds to a section G illustrated in FIG. 8A. Then, the CPU 114 detects the density of a portion corresponding to the mark 630, which corresponds to a section H illustrated in FIG. 8A. Next, the CPU 114 detects the density of an area outside the sheet, which corresponds to a section I illustrated in FIG. 8A.

Then, based on the measurement results, the CPU 114 calculates respective ranges from the measured positions of the sections A to I of the image data 800, and compares image ranges (sizes) of the marks 620 and the marks 630 with each other. Based on the results of comparison, the CPU 114 detects that the section B and the section H each are represented by the density of the mark 630, and further detects that the section D and the section F each are represented by the density of the mark 620. Furthermore, the CPU 114 detects that the section C, the section E, and the section G each are represented by the density of the background of the sheet.

Following this, based on the results of detection, the CPU 114 detects that a place where the density switches between the section A and the section B is the end 810 (the left end), and further detects that a place where the density switches between the section C and the section D is the edge 812 (the left edge) of the mark 620 (the left mark).

Furthermore, based on the results of detection, the CPU 114 detects that a place where the density switches between the section F and the section G is the edge 812 (the right edge) of the mark 620 (the right mark), and further detects that a place where the density switches between the section H and the section I is the end 810 (the right end).

Then, based on the results of detection, the CPU 114 automatically calculates a distance from the end 810 (the left end) to the edge 812 (the left edge) of the mark 620 (the left mark) as the length of the portion "c" of the adjustment chart 602. Furthermore, the CPU 114 automatically calculates a distance from the edge 812 (the right edge) of the mark 620 (the right mark) to the end 810 (the right end) as the length of the portion "g" of the adjustment chart 602. Moreover, the CPU 114 automatically calculates a distance from the end 810 (the left end) to the end 810 (the right end) as the length of the portion "a" of the adjustment chart 602.

While the method for calculating the lengths of the portions "c" and "g" of the adjustment chart 602 has been described above, the lengths of the portions "e" and "i", the portions "d" and "f", and the portions "h" and "j" of the adjustment chart 602 can also be calculated in a similar way. Furthermore, while the method for calculating the length of the portion "a" of the adjustment chart 602 has been described above, the length of the portion "b" of the adjustment chart 602 can also be calculated in a similar way.

Since, in the above-described way, the ends 810 and the edges 812 of the marks 620 are detected, the CPU 114 can automatically calculate the lengths of the portions "a" to "r" of the adjustment chart 602.

A series of processing operations for performing the adjustment of the printing position in the printing apparatus 100 according to the first exemplary embodiment is described with reference to the flowchart of FIG. 9. This series of processing operations is performed by the CPU 114 of the controller unit 110 executing a control program read out from the ROM 112 or the HDD 115 and loaded onto the RAM 113. Furthermore, this series of processing operations is started, for example, when the editing screen 500 is displayed on the display portion of the operation unit 120 and an arbitrary sheet is selected on the editing screen 500.

In step S901, the CPU 114 determines whether the button 503 on the editing screen 500 has been pressed by the user. If the CPU 114 determines that the button 503 has been pressed (YES in step S901), the processing proceeds to step S902. On the other hand, the CPU 114 determines that the button 503 has not been pressed (NO in step S901), the CPU 114 repeats processing in step S901 until it is determined that the button 503 has been pressed.

In Step S902, the CPU 114 instructs the image forming unit 151 to print the adjustment chart 602 on a sheet selected on the editing screen 500. At this time, image data for the adjustment chart 602 stored in the RAM 113 or the HDD 115 is read out and is then transferred to the printer engine 150. Then, the image forming unit 151, having received the printing instruction, prints the adjustment chart 602 on a sheet fed from the sheet feeding unit 140 based on the image data for the adjustment chart 602. Then, the sheet on which the adjustment chart 602 has been printed is discharged to outside the printing apparatus 100.

Figure 10:
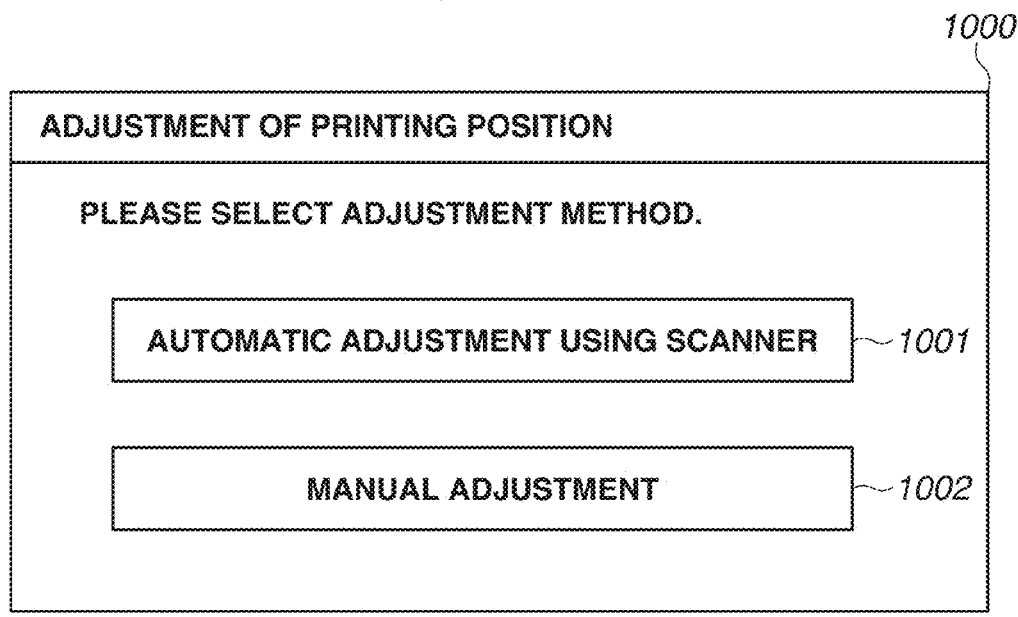
FIG. 10 illustrates a configuration of a screen according to the first exemplary embodiment.

In step S903, the CPU 114 displays a selection screen 1000 illustrated in FIG. 10 on the display portion of the operation unit 120. Then, the processing proceeds to step S904. The selection screen 1000 is a screen for allowing the user to select any one of automatic adjustment using a scanner (a button 1001) and manual adjustment (a button 1002) as an adjustment method for the printing position.

In step S904, the CPU 114 determines whether the automatic adjustment using a scanner (the button 1001) has been selected. If the button 1001 on the selection screen 1000 has been pressed, the CPU 114 determines that the automatic adjustment using a scanner (the button 1001) has been selected (YES in step S904), so that the processing proceeds to step S905. On the other hand, if the button 1002 on the selection screen 1000 has been pressed, the CPU 114 determines that the manual adjustment (the button 1002) has been selected (NO in step S904), so that the processing proceeds to step S910.

In step S905, the CPU 114 instructs the scanner unit 130 to scan the adjustment chart 602 printed in step S902. Then, the processing proceeds to step S906. In this instance, to scan the adjustment chart 602, the user places the adjustment chart 602 on the platen glass 302 or the document stacking portion 340. Then, for example, when a start key, which is used to issue an instruction to start the execution of scanning, is pressed by the user, the scanning instruction is supplied to the scanner unit 130.

In step S906, the CPU 114 analyzes the image data 800 generated by scanning the adjustment chart 602. Then, the CPU 114 detects the ends 810 of the adjustment chart 602 and the edges 812 of the marks 620 based on the marks 630, which are in contact with the respective ends of the adjustment chart 602. Then, the processing proceeds to step S907. The processing for analyzing the image data 800 is performed according to the method described with reference to FIGS. 8A and 8B.

In step S907, the CPU 114 determines whether the ends 810 of the adjustment chart 602 and the edges 812 of the marks 620 have been successfully detected. If the CPU 114 determines that the ends 810 and the edges 812 have been successfully detected (YES in step S907), the processing proceeds to step S908. On the other hand, if the CPU 114 determines that the ends 810 and the edges 812 have not been successfully detected (NO in step S907), the processing proceeds to step S909. The case where it is determined that the ends 810 and the edges 812 have not been successfully detected (NO in step S907) includes, for example, a case where because a difference in density between the background of the sheet, on which the adjustment chart 602 is printed, and the mark 620 is small, the edge 812 of the mark 620 cannot be correctly detected.

In step S908, the CPU 114 calculates the lengths of the portions "a" to "r" illustrated in FIG. 6B based on the ends 810 of the adjustment chart 602 and the edges 812 of the marks 620 detected in step S906. Then, the processing proceeds to step S911.

Figure 11:
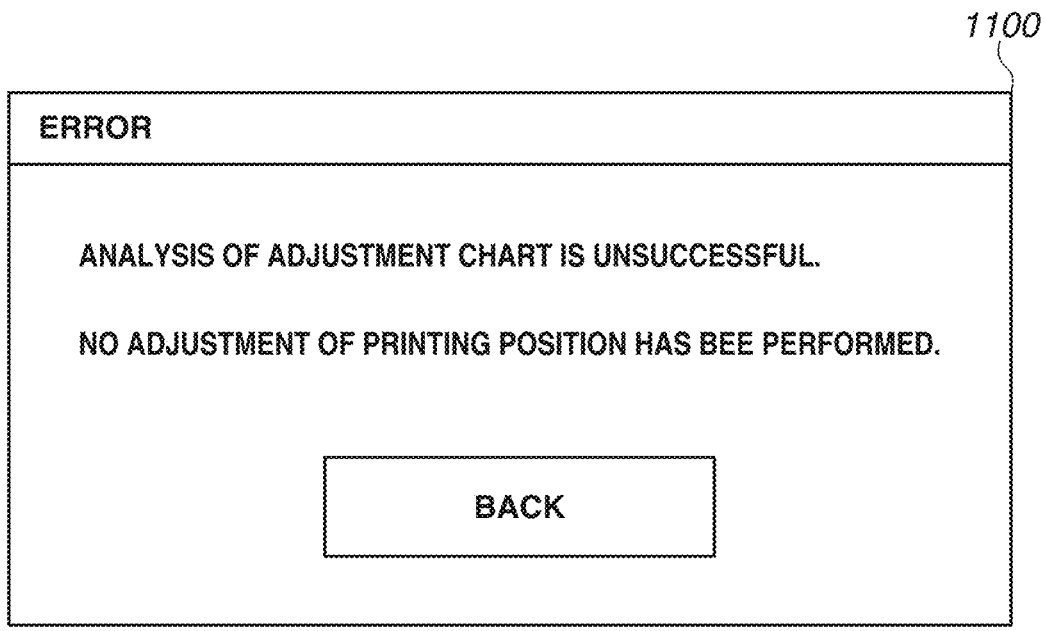
FIG. 11 illustrates a configuration of a screen according to the first exemplary embodiment.

In step S909, the CPU 114 displays an error screen 1100 illustrated in FIG. 11 on the display portion of the operation unit 120. The error screen 1100 is a screen used to inform the user that the adjustment of the printing position has not been performed due to the failure of analysis of the image data 800 of the adjustment chart 602. After the completion of processing in step S909, the series of processing operations illustrated in FIG. 9 ends.

In step S910, the CPU 114 receives, from the user, inputs of the manually measured lengths (actual measurement values) of the portions "a" to "r" on the editing screen 510. Then, the processing proceeds to step S911.

In step S911, the CPU 114 calculates the amount of deviation of the printing position 712 based on the lengths of the portions "a" to "r" calculated in step S908 or the lengths of the portions "a" to "r" received in step S910. Then, the processing proceeds to step S912. The amount of deviation of the printing position 712 is calculated using the mathematical expressions illustrated in FIG. 7.

In step S912, the CPU 114 registers, with the sheet management table 400, the amount of deviation of the printing position 712 relative to the sheet selected on the editing screen 500. Information indicating the amount of deviation of the printing position on the front surface 420 and the amount of deviation of the printing position on the back surface 421 relative to the selected sheet, which is to be registered, includes, for example, the lead position, side position, main scanning magnification, and sub scanning magnification. Then, after the completion of processing in step S912, the series of processing operations illustrated in FIG. 9 ends.

Thus far are the details of a series of processing operations for performing the adjustment of the printing position in the printing apparatus 100 according to the first exemplary embodiment.

As described above, in the first exemplary embodiment, the adjustment chart 602 on which the marks 630 are formed in such a way as to be in contact with the respective parts of the ends of the sheet is printed. Since the mark images are printed in such a way as to be in contact with the respective ends of the sheet, the ends of the sheet can be detected based on image data generated by reading the mark images.

Therefore, to perform automatic adjustment of the printing position relative to a sheet, the CPU 114 can automatically calculate the deviation of the printing position by scanning the adjustment chart 602. Accordingly, the user can save the trouble of manually measuring the length from the mark 620 of the adjustment chart 602 to the end of the adjustment chart 602 to know the deviation of the printing position.

In the above-described first exemplary embodiment, the adjustment chart 602 is printed and used even when the deviation of the printing position is adjusted with the automatic adjustment using a scanner 1001 or even when the deviation of the printing position is adjusted with the manual adjustment 1002.

On the other hand, in a case where the manual adjustment 1002 is performed, the adjustment chart 601 may be used instead of the adjustment chart 602, on which the marks 630 are printed in such a way as to be in contact with the respective ends of the sheet. This is because the manual adjustment 1002 does not require the user to refer to the marks 630 when manually measuring the length from the mark 620 to the end of the chart.

In a case where the automatic adjustment using a scanner 1001 is performed according to the pressure plate reading method, for example, after a backing sheet (not illustrated) with a black image is applied onto the adjustment chart 601 placed on the platen glass 302, the adjustment chart 601 is scanned. If the automatic adjustment using a scanner 1001 is performed according to the pressure plate reading method in such a way, the adjustment chart 601 may be used instead of the adjustment chart 602, on which the marks 630 are printed in such a way as to be in contact with the respective ends of the sheet.

On the other hand, in a case where the automatic adjustment using a scanner 1001 is performed according to the ADF reading method, the adjustment chart 601 cannot be scanned with the backing sheet with a black image applied onto the adjustment chart 601 placed on the document stacking portion 340. Therefore, if the automatic adjustment using a scanner 1001 is performed according to the ADF reading method, the adjustment chart 602, on which the marks 630 are printed in such a way as to be in contact with the respective ends of the sheet, is required to be used.

Accordingly, according to a second exemplary embodiment of the present invention, when receiving an instruction to perform automatic adjustment using a scanner 1001, the printing apparatus 100 is configured to allow the user to arbitrarily select one of performing the adjustment of the printing position using the pressure plate reading method and performing the adjustment of the printing position using the ADF reading method. Then, when receiving an instruction to perform the adjustment of the printing position using the pressure plate reading method, the printing apparatus 100 prints the adjustment chart 601, and, when receiving an instruction to perform the adjustment of the printing position using the ADF reading method, the printing apparatus 100 prints the adjustment chart 602. Furthermore, on the other hand, when receiving an instruction to perform the manual adjustment 1002, the printing apparatus 100 prints the adjustment chart 601 as described below.

A series of processing operations for performing the adjustment of the printing position in the printing apparatus 100 according to the second exemplary embodiment is described with reference to the flowchart of FIG. 12. This series of processing operations is performed by the CPU 114 of the controller unit 110 executing a control program read out from the ROM 112 or the HDD 115 and loaded onto the RAM 113. Furthermore, this series of processing operations is started, for example, when the editing screen 500 is displayed on the display portion of the operation unit 120 and an arbitrary sheet is selected on the editing screen 500.

In step S1201, the CPU 114 determines whether the button 503 on the editing screen 500 has been pressed by the user. If the CPU 114 determines that the button 503 has been pressed (YES in step S1201), the processing proceeds to step S1202. On the other hand, the CPU 114 determines that the button 503 has not been pressed (NO in step S1201), the CPU 114 repeats processing in step S1201 until it is determined that the button 503 has been pressed.

In step S1202, the CPU 114 displays the selection screen 1000 illustrated in FIG. 10 on the display portion of the operation unit 120. Then, the processing proceeds to step S1203.

In step S1203, the CPU 114 determines whether the automatic adjustment using a scanner (the button 1001) has been selected. If the button 1001 on the selection screen 1000 has been pressed, the CPU 114 determines that the automatic adjustment using a scanner (the button 1001) has been selected (YES in step S1203), so that the processing proceeds to step S1204. On the other hand, if the button 1002 on the selection screen 1000 has been pressed, the CPU 114 determines that the manual adjustment (the button 1002) has been selected (NO in step S1203), so that the processing proceeds to step S1215.

Figure 13:
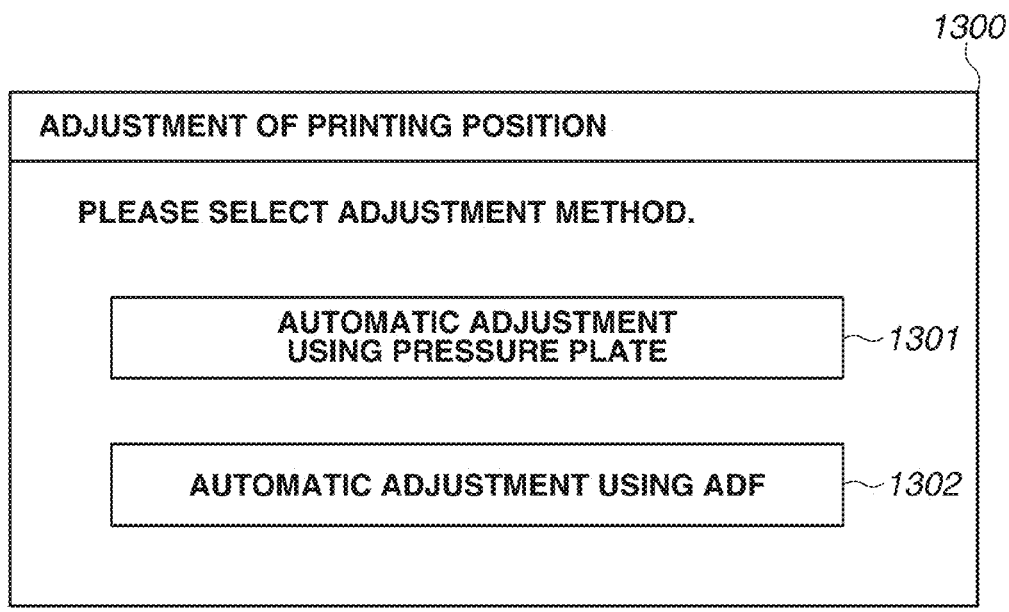
FIG. 13 illustrates a configuration of a screen according to the second exemplary embodiment.

In step S1204, the CPU 114 displays a selection screen 1300 illustrated in FIG. 13 on the display portion of the operation unit 120. Then, the processing proceeds to step S1205. The selection screen 1300 is a screen for allowing the user to select any one of automatic adjustment using a pressure plate (a button 1301) and automatic adjustment using an ADF (a button 1302) as an adjustment method for the printing position.

In step S1205, the CPU 114 determines whether the automatic adjustment using an ADF (the button 1302) has been selected. If the button 1302 on the selection screen 1300 has been pressed, the CPU 114 determines that the automatic adjustment using an ADF (the button 1302) has been selected (YES in step S1205), so that the processing proceeds to step S1206. On the other hand, if the button 1301 on the selection screen 1300 has been pressed, the CPU 114 determines that the automatic adjustment using a pressure plate (the button 1301) has been selected (NO in step S1205), so that the processing proceeds to step S1209.

In Step S1206, the CPU 114 instructs the image forming unit 151 to print the adjustment chart 602 on a sheet selected on the editing screen 500. At this time, image data for the adjustment chart 602 stored in the RAM 113 or the HDD 115 is read out and is then transferred to the printer engine 150. Then, the image forming unit 151, having received the printing instruction, prints the adjustment chart 602 on a sheet fed from the sheet feeding unit 140 based on the image data for the adjustment chart 602. Then, the sheet on which the adjustment chart 602 has been printed is discharged to outside the printing apparatus 100. After the completion of processing in step S1206, the processing proceeds to step S1207.

In step S1207, the CPU 114 instructs the scanner unit 130 to scan the adjustment chart 602 printed in step S1206 according to the ADF reading method. Then, the processing proceeds to step S1208. In this instance, to scan the adjustment chart 602, the user places the adjustment chart 602 on the document stacking portion 340. Then, for example, when a start key, which is used to issue an instruction to start the execution of scanning, is pressed by the user, the scanning instruction is supplied to the scanner unit 130.

In step S1208, the CPU 114 analyzes the image data 800 generated by scanning the adjustment chart 602. Then, the CPU 114 detects the ends 810 of the adjustment chart 602 and the edges 812 of the marks 620 based on the marks 630, which are in contact with the respective ends of the adjustment chart 602. Then, the processing proceeds to step S1212. The processing for analyzing the image data 800 is performed according to the method described with reference to FIGS. 8A and 8B.

In Step S1209, the CPU 114 instructs the image forming unit 151 to print the adjustment chart 601 on a sheet selected on the editing screen 500. At this time, image data for the adjustment chart 601 stored in the RAM 113 or the HDD 115 is read out and is then transferred to the printer engine 150. Then, the image forming unit 151, having received the printing instruction, prints the adjustment chart 601 on a sheet fed from the sheet feeding unit 140 based on the image data for the adjustment chart 601. Then, the sheet on which the adjustment chart 601 has been printed is discharged to outside the printing apparatus 100. After the completion of processing in step S1209, the processing proceeds to step S1210.

In step S1210, the CPU 114 instructs the scanner unit 130 to scan the adjustment chart 601 printed in step S1209 according to the pressure plate reading method. Then, the processing proceeds to step S1211. In this instance, to scan the adjustment chart 601, the user places the adjustment chart 601 on the platen glass 302. Then, for example, when a start key, which is used to issue an instruction to start the execution of scanning, is pressed by the user, the scanning instruction is supplied to the scanner unit 130.

In step S1211, the CPU 114 analyzes image data (not illustrated) generated by scanning the adjustment chart 601. Then, the CPU 114 detects the ends 810 of the adjustment chart 601 and the edges 812 of the marks 620 based on a difference in density between the background of the adjustment chart 601 and an area outside the adjustment chart 601. The processing for analyzing the image data performed in step S1211 is performed according to a method similar to the method described with reference to FIGS. 8A and 8B, and is, therefore, omitted from the detailed description. After the completion of processing in step S1211, the processing proceeds to step S1212.

In step S1212, the CPU 114 determines whether the ends 810 of the adjustment chart 601 or 602 and the edges 812 of the marks 620 have been successfully detected. If the CPU 114 determines that the ends 810 and the edges 812 have been successfully detected (YES in step S1212), the processing proceeds to step S1213. On the other hand, if the CPU 114 determines that the ends 810 and the edges 812 have not been successfully detected (NO in step S1212), the processing proceeds to step S1214. The case where it is determined that the ends 810 and the edges 812 have not been successfully detected (NO in step S1212) includes, for example, a case where because a difference in density between the background of the sheet, on which the adjustment chart 601 or 602 is printed, and the mark 620 is small, the edges 812 of the mark 620 cannot be correctly detected.

In step S1213, the CPU 114 calculates the lengths of the portions "a" to "r" illustrated in FIG. 6A or FIG. 6B based on the ends 810 of the adjustment chart 602 or 601 and the edges 812 of the marks 620 detected in step S1208 or S1211. Then, the processing proceeds to step S1217.

In step S1214, the CPU 114 displays an error screen 1100 illustrated in FIG. 11 on the display portion of the operation unit 120. After the completion of processing in step S1214, the series of processing operations illustrated in FIG. 12 ends.

In Step S1215, the CPU 114 instructs the image forming unit 151 to print the adjustment chart 601 on a sheet selected on the editing screen 500. At this time, image data for the adjustment chart 601 stored in the RAM 113 or the HDD 115 is read out and is then transferred to the printer engine 150. Then, the image forming unit 151, having received the printing instruction, prints the adjustment chart 601 on a sheet fed from the sheet feeding unit 140 based on the image data for the adjustment chart 601. Then, the sheet on which the adjustment chart 601 has been printed is discharged to outside the printing apparatus 100. After the completion of processing in step S1215, the processing proceeds to step S1216.

In step S1216, the CPU 114 receives, from the user, inputs of the manually measured lengths (actual measurement values) of the portions "a" to "r" on the editing screen 510. Then, the processing proceeds to step S1217.

In step S1217, the CPU 114 calculates the amount of deviation of the printing position 712 based on the lengths of the portions "a" to "r" calculated in step S1213 or the lengths of the portions "a" to "r" received in step S1216. Then, the processing proceeds to step S1218. The amount of deviation of the printing position 712 is calculated using the mathematical expressions illustrated in FIG. 7.

In step S1218, the CPU 114 registers, with the sheet management table 400, the amount of deviation of the printing position 712 relative to the sheet selected on the editing screen 500. Information indicating the amount of deviation of the printing position on the front surface 420 and the amount of deviation of the printing position on the back surface 421 relative to the selected sheet, which is to be registered, includes, for example, the lead position, side position, main scanning magnification, and sub scanning magnification. Then, after the completion of processing in step S1218, the series of processing operations illustrated in FIG. 12 ends.

Thus far are the details of a series of processing operations for performing the adjustment of the printing position in the printing apparatus 100 according to the second exemplary embodiment.

Figure 12:
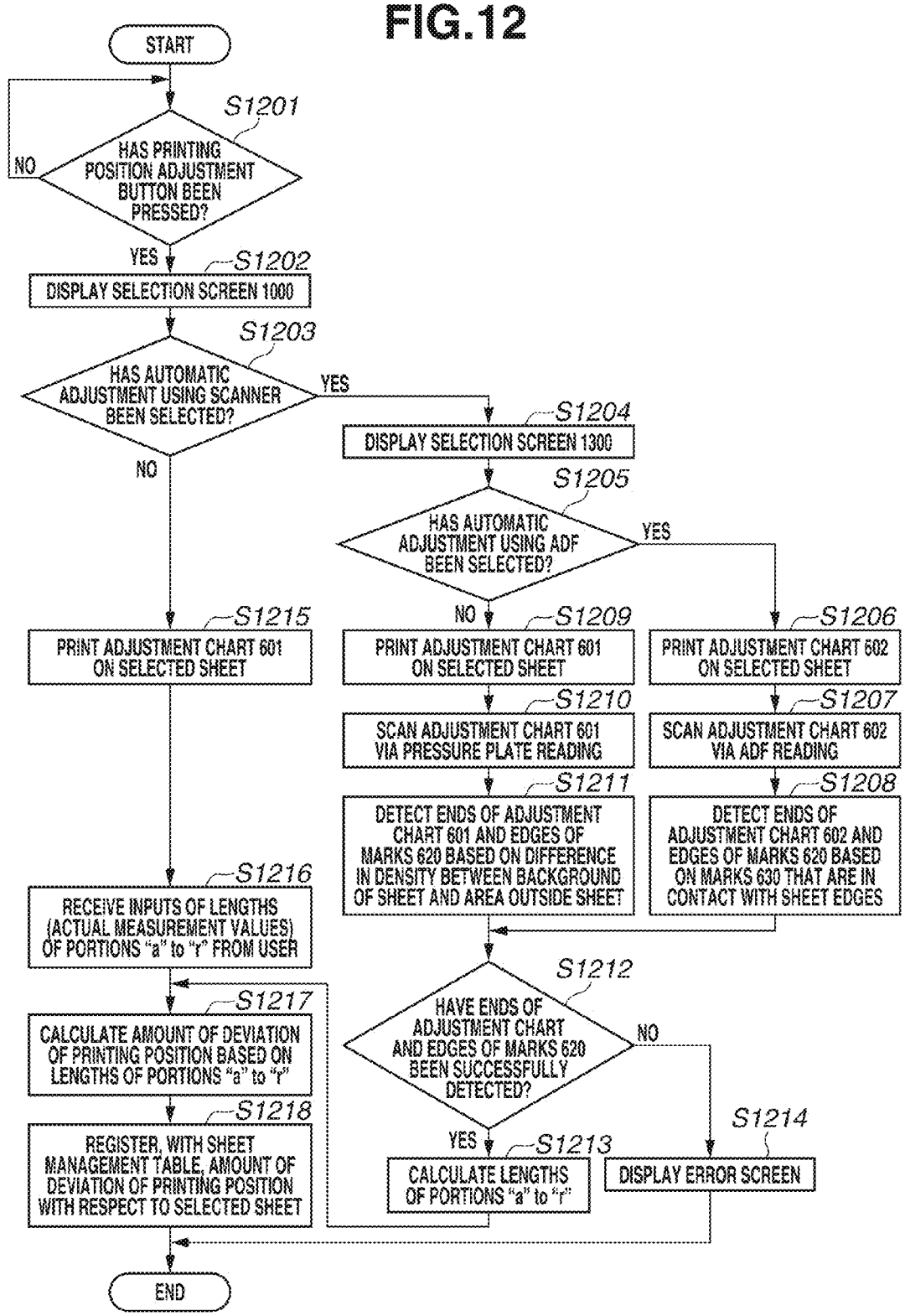
FIG. 12 is a flowchart illustrating an example of a control operation according to a second exemplary embodiment.

Furthermore, while, in the above-described series of processing operations illustrated in FIG. 12, if an instruction to perform the manual adjustment 1002 is received, the adjustment chart 601 is printed, this is not limiting. For example, even if an instruction to perform the manual adjustment 1002 is received, the adjustment chart 602 may be printed. Moreover, the user may be allowed to previously set, via a setting screen (not illustrated), whether to print the adjustment chart 601 or to print the adjustment chart 602 if an instruction to perform the manual adjustment 1002 is received.

Additionally, while, if an instruction to perform the automatic adjustment using a pressure plate 1301 is received, the adjustment chart 601 is printed, this is not limiting. For example, even if an instruction to perform the automatic adjustment using a pressure plate 1301 is received, in a case where scanning is performed from above an adjustment chart with no backing sheet with a black image applied thereto, the adjustment chart 602 may be printed. Moreover, the user may be allowed to previously set, via a setting screen (not illustrated), whether to print the adjustment chart 601 or to print the adjustment chart 602 if an instruction to perform the automatic adjustment using a pressure plate 1301 is received.

As described above, in the second exemplary embodiment, an adjustment chart appropriate for the adjustment of the printing position can be printed on a sheet according to the setting of whether to perform the adjustment of the printing position using the pressure plate reading method, whether to perform the adjustment of the printing position using the ADF reading method, or whether to perform the manual adjustment of the printing position.

The present invention is not limited to the above-described exemplary embodiments, but may be embodied in various modifications (including an organic combination of the exemplary embodiments) based on the gist of the present invention, which should not be construed to be excluded from the scope of the present invention.

For example, while, in the above-described exemplary embodiments, the CPU 114 of the controller unit 110 of the printing apparatus 100 functions to perform the above-described various control operations, the present invention is not limited to this configuration. For example, a printing control apparatus, such as an external controller, which is separated from the printing apparatus 100 may perform a part or the whole of the above-described various control operations.

Furthermore, while, in the above-described exemplary embodiments, to scan the printed adjustment chart with the scanner unit 130, the user places the adjustment chart 601 or 602 on the platen glass 302 or the document stacking portion 340, this is not limiting. For example, a line scanner may be mounted on the conveyance path for sheets, so that, within a period from when an image of the adjustment chart is formed on a sheet to when the sheet is discharged to outside the printing apparatus 100, the sheet (in other words, the adjustment chart) can be read by the line scanner.

Moreover, while the exemplary embodiments to which the present invention is applied have been described using the printing apparatus 100 including the image forming unit 151 dealing with a single-color toner, this is not limiting. For example, a color printing apparatus 100 including an image forming unit 151 dealing with a plurality of color toners can also be used to describe exemplary embodiments to which the present invention is applied in a similar way. For example, in the case of a full-color printing apparatus 100 dealing with four color toners, including cyan (C), magenta (M), yellow (Y), and black (K) toners, the adjustment of the printing position can be first performed using black toner, and, then, the adjustment of the printing position for other color toners can be performed based on the adjusted printing position for black toner.

While the present invention has been described with reference to various exemplary embodiments and modifica-

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-242446 filed Nov. 28, 2014, which is hereby incorporated by reference herein in its entirety.

What is claimed is:

1. A printing apparatus comprising:
   a reading unit configured to convey a sheet, and read an image on the sheet to generate image data;
   a printing unit configured to print adjustment images;
   a detecting unit configured to detect the end of the sheet based on adjustment image data generated by the reading unit reading the adjustment images printed on the sheet by the printing unit;
   an obtaining unit configured to obtain an amount of shift in the printing position based on the end of the sheet detected by the detecting unit and the adjustment image data;
   a print controlling unit configured to control, based on the amount of shift in the printing position obtained by the obtaining unit, the printing unit to print an image on the sheet; and
   a designating unit configured to designate whether to cause the reading unit to convey the sheet and read the adjustment images printed on the sheet while the sheet on which the adjustment images are printed is conveyed, or configured to designate whether to cause the reading unit to read the adjustment images printed on the sheet without conveying the sheet on which the adjustment images are printed,
   wherein the adjustment images include a first adjustment image formed on an edge region of the sheet and a second adjustment image formed on a region different from the region where the first adjustment image is formed,
   wherein the printing unit prints the adjustment images in a case where it is designated by the designating unit to cause the reading unit to convey the sheet and read the adjustment images printed on the sheet while the sheet on which the adjustment images are printed is conveyed, and
   wherein the printing unit does not print the first adjustment image in a case where it is designated by the designating unit to cause the reading unit to read the adjustment images printed on the sheet without conveying the sheet on which the adjustment images are printed.

2. The printing apparatus according to claim 1, further comprising a setting unit configured to set, to the sheet, the amount of shift in the printing position obtained by the obtaining unit,
   wherein the print controlling unit controls, based on the amount of shift in the printing position set by the setting unit, the printing unit to print an image on the sheet.

3. The printing apparatus according to claim 1, further comprising a selecting unit configured to select, based on an instruction from a user, the sheet,
   wherein the printing unit prints the adjustment images on the sheet selected by the selecting unit.

4. The printing apparatus according to claim 1, wherein the first adjustment image is a black image.

* * * * *